United States Patent
Richardson

(10) Patent No.: US 10,867,320 B2
(45) Date of Patent: Dec. 15, 2020

(54) NAVIGATING THROUGH CONTENT ITEMS ON A COMPUTING DEVICE

(71) Applicant: Facebook, Inc., Menlo Park, CA (US)

(72) Inventor: Mark A. Richardson, Seattle, WA (US)

(73) Assignee: FACEBOOK, INC., Menlo Park, CA (US)

( * ) Notice: Subject to any disclaimer, the term of this patent is extended or adjusted under 35 U.S.C. 154(b) by 267 days.

(21) Appl. No.: 15/696,034

(22) Filed: Sep. 5, 2017

(65) Prior Publication Data

US 2017/0364951 A1    Dec. 21, 2017

Related U.S. Application Data

(63) Continuation of application No. 14/493,149, filed on Sep. 22, 2014, now Pat. No. 9,754,286.

(51) Int. Cl.
| | |
|---|---|
| *G06F 3/048* | (2013.01) |
| *G06Q 30/02* | (2012.01) |
| *G06F 3/0481* | (2013.01) |
| *G06F 3/0485* | (2013.01) |
| *G06F 16/9535* | (2019.01) |
| *G06F 3/0482* | (2013.01) |
| *G06Q 50/00* | (2012.01) |
| *G06F 3/0488* | (2013.01) |

(52) U.S. Cl.
CPC ....... *G06Q 30/0255* (2013.01); *G06F 3/0481* (2013.01); *G06F 3/0482* (2013.01); *G06F 3/0485* (2013.01); *G06F 16/9535* (2019.01); *G06Q 50/01* (2013.01); *G06F 3/0488* (2013.01)

(58) Field of Classification Search
CPC . G06Q 30/0255; G06F 3/0481; G06F 3/0485; G06F 17/30867
USPC .......................... 715/527, 784, 830
See application file for complete search history.

(56) References Cited

U.S. PATENT DOCUMENTS

| | | | |
|---|---|---|---|
| 8,832,590 B1* | 9/2014 | Al-Mohssen | G09G 5/00 715/785 |
| 8,849,846 B1 | 9/2014 | Wang | |
| 9,754,286 B2 | 9/2017 | Richardson | |
| 2013/0088520 A1 | 4/2013 | Mak | |
| 2014/0331169 A1 | 11/2014 | Dubey et al. | |

OTHER PUBLICATIONS

U.S. Appl. No. 14/493,149, filed Aug. 24, 2016, Office Action.
U.S. Appl. No. 14/493,149, filed May 3, 2017, Notice of Allowance.

* cited by examiner

*Primary Examiner* — Alex Olshannikov
(74) *Attorney, Agent, or Firm* — Keller Jolley Preece

(57) ABSTRACT

One or more embodiments of the disclosure include methods and systems that allows for improved user navigation within a group of content items. For example, a content navigation system can identify a content item within a group of content items to provide to a user in response to a user interaction. In some embodiments, the content navigation system can identify a content item to provide to the user based on one or more factors, such as a characteristic of a user interaction and a relevance of a content item. In addition, the content navigation system can strategically provide advertisement content items to a user by adjusting one or more factors with respect to advertisement content items.

20 Claims, 9 Drawing Sheets

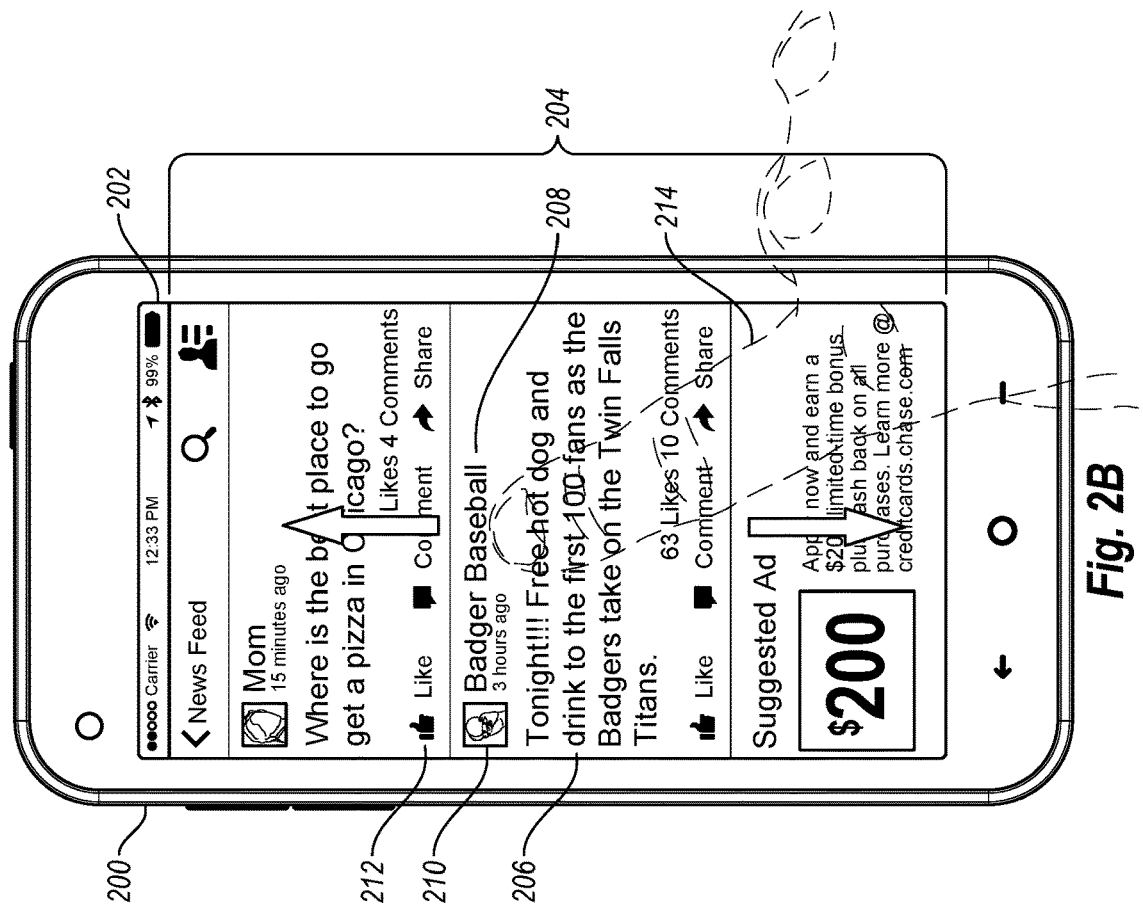
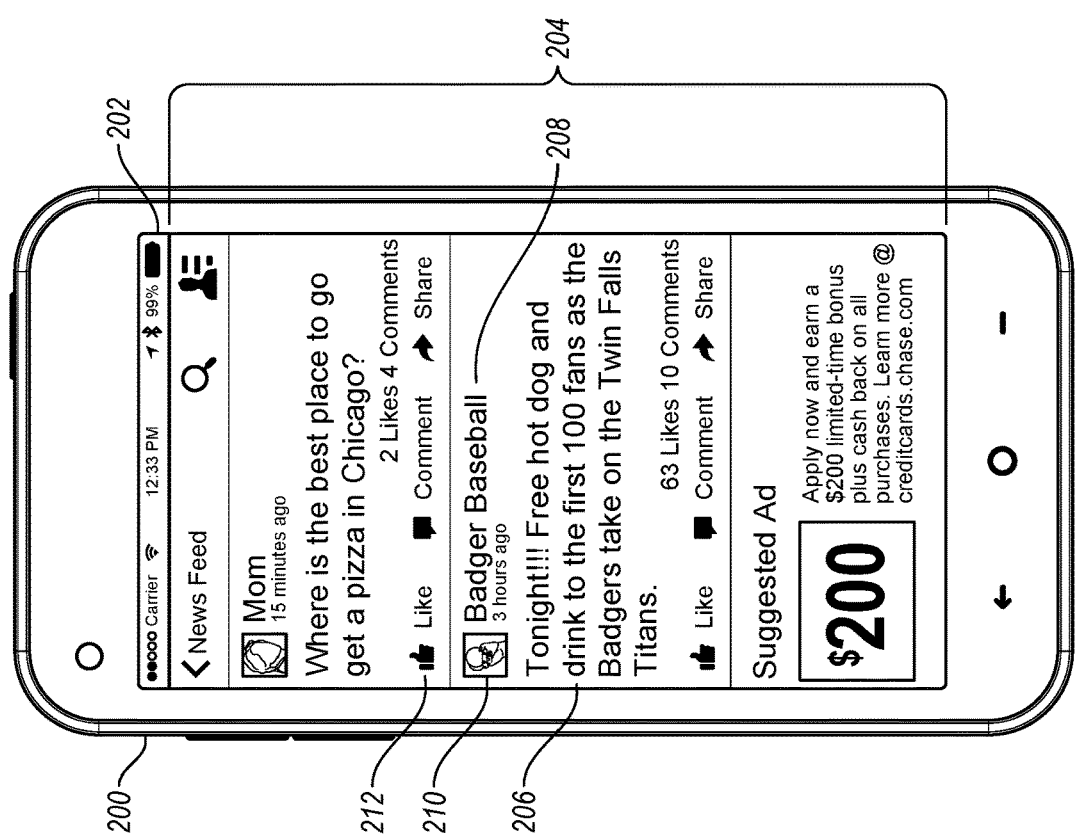
Fig. 2B
Fig. 2A

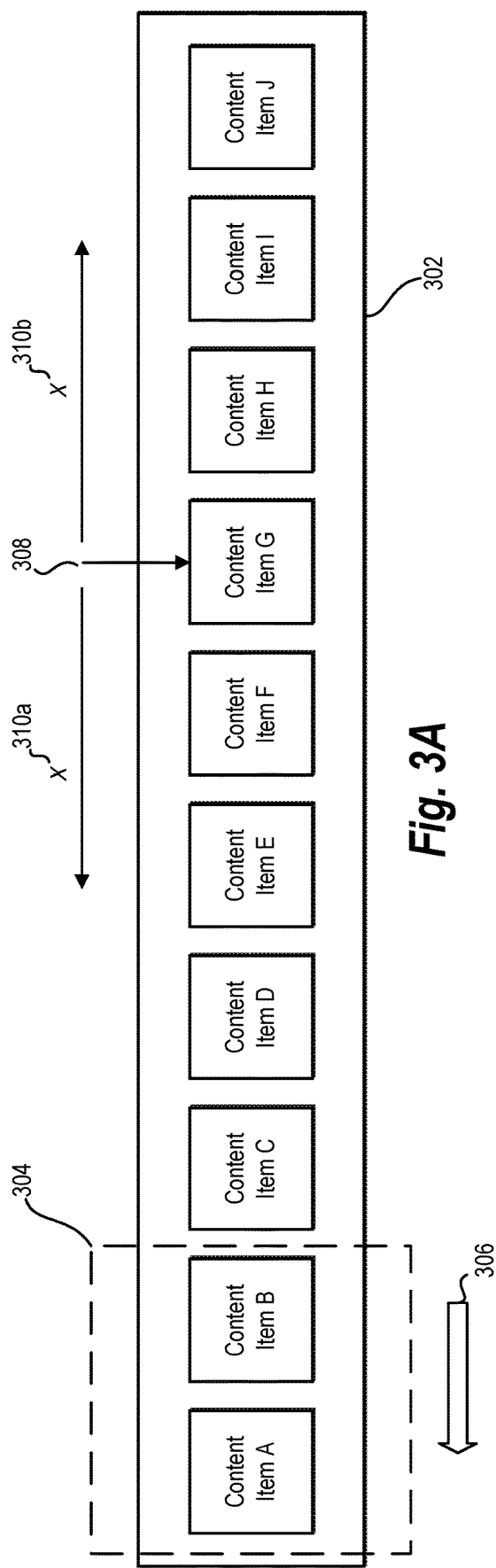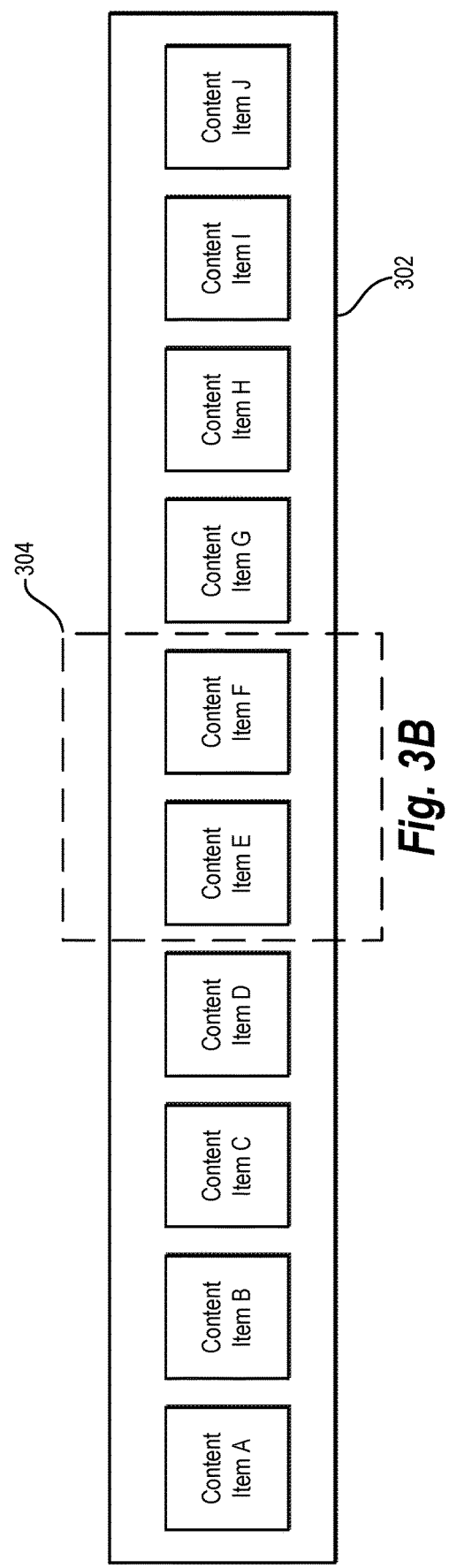

| Content Item | Relevance Factor | Proximity Factor |
|---|---|---|
| A | N/A | - |
| B | N/A | - |
| C | N/A | - |
| D | 4 | 1 |
| E | 5 | 2 |
| F | 3 | 3 |
| G | 2 | 4 |
| H | 3 | 3 |
| I | 4 | 2 |
| J | 5 | 1 |

*Fig. 4*

NAVIGATING THROUGH CONTENT ITEMS ON A COMPUTING DEVICE

CROSS REFERENCE TO RELATED APPLICATIONS

The present application is a continuation of U.S. application Ser. No. 14/493,149, filed Sep. 22, 2014. The aforementioned application is hereby incorporated by reference in its entirety.

BACKGROUND

1. Technical Field

One or more embodiments relate to systems and methods for navigating content located on a computing device. More specifically, one or more embodiments of the present invention relate to systems and methods of navigating within a group of content items to locate content.

2. Background and Relevant Art

Computing devices (e.g., computers, tablets, and smart phones) provide users access to large amounts of content. Due to the large amount of available content, there is often a need to provide users the ability to navigate through content to experience content and/or locate specific content. Although there are a variety of conventional systems used to navigate through content, many conventional systems include a scrolling feature that allows a user to scroll through content items (e.g., social-network posts in a newsfeed). For example, a user can provide a user interaction to cause a computing device to slowly browse through content items, or alternatively, quickly scroll through a group of content items (e.g., quickly skipping over one or more content items).

Conventional systems, however, have a number of disadvantages. For example, when a user scrolls through a group of content items, conventional systems often provide the user with a content item that has no particular relevance or interest to the user. In particular, in many conventional systems, the amount of scrolling through a group of content items is only related to a characteristic of a user interaction (e.g., the distance or speed of a user's touch gesture). As a result, the content item a conventional system provides to the user in response to a user interaction is essentially random and of no particular interest to the user. Conventional systems, therefore, often cause the user to further navigate in search of a content item in which the user is interested. Navigating through content items of little interest to the user can be time consuming and frustrating for a user.

Additionally, in response to a user interaction to navigate within a group of content items, many conventional systems provide one or more incomplete or "cutoff" items (e.g., a portion of a content item is not within a viewable area of a display). In particular, due to the amount of scrolling being based solely on a user interaction, the scrolling stopping point within a conventional system is not related to any particular content item. Therefore, the scrolling stopping point may be located between two adjacent content items, causing one or more content items to be cutoff. Again, the user needs to further navigate to view the rest of the cutoff content item, which in turn diminishes the user experience.

In addition to the user disadvantages described above, conventional systems often include disadvantages for a system provider. For example, conventional systems do not allow the system provider to effectively control which content item to provide to a user when the user scrolls through a group of content items. In particular, a system provider may desire to provide advertisements that are interspersed between content items such that a user views one or more advertisements while navigating through content items. Conventional systems, however, do not allow system providers the ability to optimize the presentation of advertisements to a user in a manner that satisfies the business objectives of the system provider, while at the same time maintains a quality user experience.

Accordingly, there are a number of considerations to be made in improving user navigation through content located on a computing device.

SUMMARY

One or more embodiments described below provide benefits and/or solve one or more of the foregoing or other problems in the art with methods and systems for improving user navigation through content items on a computing device. For example, the principles described herein provide methods and systems that allow a user to easily and quickly navigate to content items that have an increased relevance to the user. In addition, the principles described herein provide methods and systems that allow content navigation system providers a greater ability to strategically control the presentation of advertisement content items to optimize the advertisement capability of a content navigation system, while also maintaining a quality user experience.

In particular, the methods and systems disclosed herein provide relevant content items to a user when the user navigates within a group of content items. In one or more example embodiments, a user provides a user interaction to a computing device to navigate within a group of content items. The systems and methods described herein can use the user interaction, in combination with content item characteristics and/or other information, to identify, and subsequently provide to the user, a content item that is of particular relevance to the user (e.g., a content item that is likely the most relevant to the user).

The methods and systems disclosed herein allow users to quickly and efficiently locate relevant content items within a group of content items, thereby minimizing the need for a user to further navigate in search of a content item in which the user is interested. In addition, due to the ability of the content navigation system to identify a specific content item to provide to a user, the content navigation system can cause the computing device to display the specific content item in an optimal viewing position on the computing device (e.g., the content item is not "cutoff"). Accordingly, the methods and systems described herein can increase the efficiency and ease of navigating within a group of content items, which enhances the user experience of the content navigation system.

In addition, the methods and systems disclosed herein allow a content navigation system provider increased control over which content items a user views when navigating within a group of content items. For example, the methods and systems disclosed herein allow a content navigation system provider to seamlessly and strategically present an advertisement content item to a user. In particular, a content navigation system provider can present an advertisement content item to a user in a manner that optimizes the advertisement capabilities of a content navigation system, yet at the same time minimizes impact on the user experience.

Additional features and advantages will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of one or more embodiments can be obtained, a more particular description will be rendered by reference to specific embodiments thereof that are illustrated in the accompanying drawings. It should be noted that the figures are not drawn to scale, and that elements of similar structure or function are generally represented by like reference numerals for illustrative purposes throughout the figures. These drawings depict only typical embodiments, and are not therefore considered to be limiting of its scope. Accordingly, various embodiments will be described and explained with additional specificity and detail through the use of the accompanying drawings.

FIGS. 2A-B illustrate an example computing device having a user interface in accordance with one or more embodiments described herein;

FIGS. 3A-B illustrate a concept diagram of a content navigation system in accordance with one or more embodiments described herein;

FIG. 4 illustrates an example of a data table for use within a content navigation system in accordance with one or more embodiments described herein;

DETAILED DESCRIPTION

Figure 1:
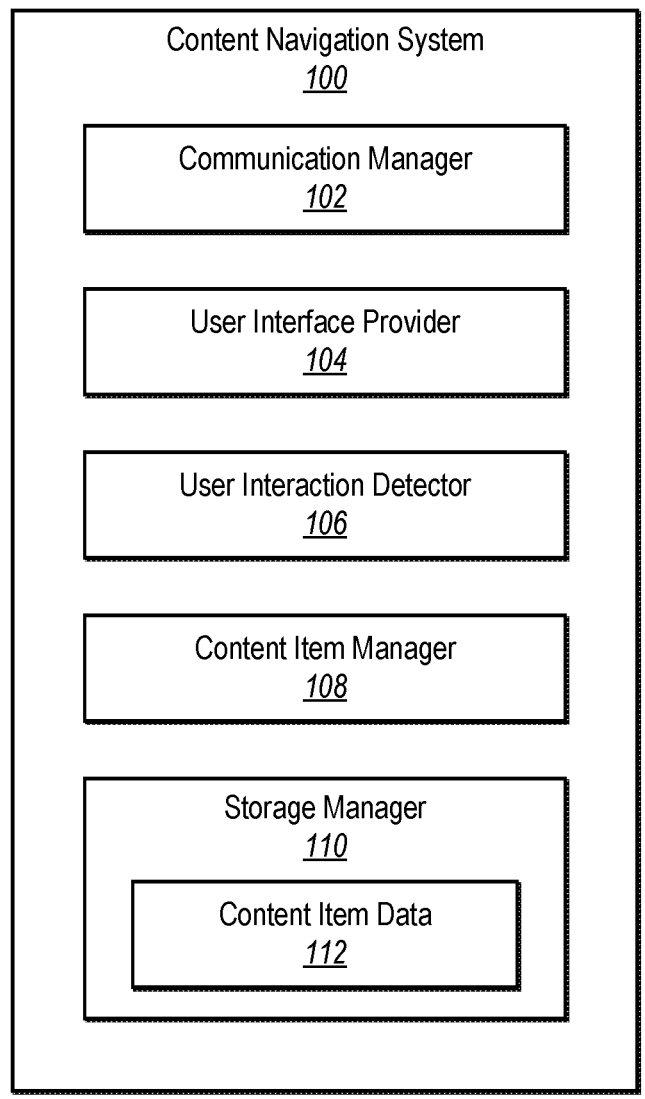
FIG. 1 illustrates a schematic diagram of a content navigation system in accordance with one or more embodiments described herein.

Embodiments disclosed herein provide benefits and/or solve one or more of the abovementioned or other problems in the art with a content navigation system that improves navigation within a group of content items. In particular, one or more embodiments include a content navigation system that allows a user to easily and quickly navigate to content items relevant to a user from among a group of content items. In addition, one or more embodiments can provide a content navigation system that offers content navigation system providers increased control over advertisement capabilities of the content navigation system, while also maintaining a quality user experience.

In particular, one or more embodiments of a content navigation system provide a user the ability to quickly and efficiently navigate through a large number of content items (e.g., scroll through a group of content items) and locate a content item that is relevant to the user (e.g., the content navigation system provides a relevant content item to a user at a stopping point of the scroll). For instance, the user may exhibit a varying degree of interest for each content item within a group of content items. Therefore, when a user is navigating within a group of content items, the content navigation system can account for user interest to identify a relevant content item to provide to the user.

Example embodiments of a content navigation system can use a variety of data and/or functions to identify and provide a content item that is relevant to the user. In one or more embodiments, the content navigation system can detect or determine one or more user interaction characteristics of a user interaction. The content navigation system can use the one or more user interactions characteristics in the process to identify a relevant content item to provide to the user. For example, the content navigation system can use one or more user interaction characteristics to determine an initial scroll distance. In one or more embodiments, the content navigation system uses the one or more user interaction characteristics to identify a target content item. For example, a target item can represent a content item identified within a group of content items based solely on the magnitude of one or more user interaction characteristics.

In addition to the target content item, in one or more example embodiments, the content navigation system can identify or determine a proximity range relative to the target content item. For example, the proximity range can include a defined number of content items nearest the target content item within a listing of content items. In other words, the content navigation system can use the proximity range to identify a subset of content items within the group of content items that correspond to one or more user interaction characteristics.

Furthermore, upon identifying content items within a proximity range, the content navigation system can analyze one or more characteristics or properties of each content item within the proximity range. For example, the content navigation system can identify a relevance factor for the content items within the proximity range. A relevance factor can generally represents a predicted level of interest in a content item and be based on various user preference and/or content item characteristics. Accordingly, the content navigation system can take into account the interests of a user in identifying a content item to provide to the user in response to a user interaction to navigate through content items.

In addition to a relevance factor, in one or more embodiments, a content navigation system can identify or determine a proximity factor for content items based on each content item's proximity to a target content item. For example, the content navigation system can use the proximity factor to favor content items located immediately adjacent to the target content item, and disfavor content items located farther away from the target content item. In this manner, a content navigation system can seamlessly identify a relevant content item to provide to a user based on a combination of a user interaction, content item relevance to the user, and proximity to a target content item.

In addition to increasing the quality of the user experience by providing content items of interest to a user, and as mentioned above, a content navigation system can provide one or more advantages to content navigation system providers. For example, a content navigation system can allow a system provider to selectively favor or disfavor one or more types of content items to predictably control the presentation of one or more types of content items in response to a user interaction. In one or more embodiments, a the content navigation system can strategically favor advertisement content items by assigning advertisement content items a high relevance factor that causes the content navigation system to identify an advertisement content item to provide to the user in response to a user interaction. Moreover, the content navigation system can dynamically adjust the various factors used to identify advertisement content items to provide a balance between providing a quality user experience and meeting one or more business objectives of the content navigation system. The above, as well as additional features and benefits of one or more embodiments of the present invention will be described below in more detail.

As used herein, "content item" refers generally to any data or information a computing device can present to a user. For example, a content item can be included within a group of content items. To illustrate, examples of a content item can include a social-network post within a social-network newsfeed, a contact in a contact list, or a digital image in a digital image gallery. A group of content item does not necessarily include the same or similar content items. For example, a group of content items can include a plurality of several different types of content items. Additional examples of content items include digital media, audio/music files, electronic documents, location information, notifications, advertisements, and/or search results. In addition, a content item can be one of several types of electronic communication, including posts through a social-networking system, user comments, user reviews/ratings, blog posts, posts to a website, instant messages, picture messages, video messages, text messages or any other type of content that facilitates the communication of electronic data from one user to another user.

For purposes of describing one or more embodiments disclosed herein, reference is often made to content items representing social-network posts within a social-network newsfeed. A social-network post can include various types of information. For example, a social-network post can include text, contacts, images (e.g., photographs), videos, location information, and/or additional data information. To illustrate, a social-network post can include a text portion, a digital photo, and location information of where the digital photo was taken.

FIG. 1 illustrates an example embodiment of a content navigation system 100 (or simply "system 100"). In some embodiments, one or more computing devices can implement the system 100. For example, one or more computing devices described below in connection with FIG. 7 can implement the system 100. In particular, a computing device may perform one or more operations associated with the identification of a content item to provide to a user in response to a user interaction, as disclosed herein.

As shown, the system 100 may include, but is not limited to, a communication manager 102, a user interface provider 104, a user interaction detector 106, a content item manager 108, and a storage manager 110 having content item data 112. In general, the communication manager 102 can receive and send data associated with content items. The user interface provider 104 can provide, manage, and/or control a graphical user interface (or simply "user interface"). The user interaction detector 106 can detect one or more user interactions and provide input data to the content item manager 108. The content item manager 108 can facilitate the identification of content items to provide to a user in response to a user interaction. The storage manager 110 can store and retrieve data, such as content item data 112.

As shown in FIG. 1, the system 100 can include a communication manager 102. The communication manager 102 can facilitate receiving and sending data to and from the system 100. For example, communication manager 102 can facilitate receiving and sending content items. In one or more embodiments, the communication manager 102 can receive a content item from a system provider through one or more communication channels using an appropriate communication protocol, format the content item in any necessary format, and provide the content item to the user interface provider 104, as described herein.

As mentioned above, the system 100 can include a user interface provider 104 as shown in FIG. 1. The user interface provider 104 can provide, manage, and/or control a user interface that allows a user to navigate through content items within a group of content items using the system 100. For example, the user interface provider 104 can provide a user interface that allows a user to navigate through social-network posts within a social-network news feed. Although, and as described above, the user interface provider 104 can provide a user interface that allows a user to navigate through all types of content items.

Notwithstanding the type of content items associated with a user interface, the user interface provider 104 can cause a computing device to provide a user interface with which a user can interact. For example, the user interface provider 104 can cause a touch screen associated with a computing device to display graphical objects that enable viewing and navigating within a group of content items. In particular, a user can provide a user interaction directed at the user interface, or at the one or more graphical objects, displayed on the touch screen to navigate within a group of content items. Alternatively, the user interface provider 104 can cause another display device, such as a monitor to display a user interface to a user.

Depending on the type of content item, among other considerations, the user interface provider 104 can provide a user interface that facilitates the display of content items in an arrangement that allows a user to easily navigate through the content items. In particular, the user interface provider 104 can arrange content items in a list arrangement (e.g., an array). Alternatively, the user interface provider 104 can arrange content items in a grid arrangement (e.g., a matrix). Further, the user interface provider 104 can provide content items in any arrangement suitable for a particular content item application. In addition, the user interface provider 104 can loop content items, such that the user interface provider 104 displays the first content item and the last content item in a group of content items adjacent to each other when a user is navigating through the group of content items.

Regardless of the arrangement of the content items, the user interface provider 104 can provide the ability for a user to select one or more content items, which can provide additional functionality with respect to the selected content item. For instance, in a social-network post, upon a user selecting a content item (e.g., by way of a tap gesture), the user interface provider 104 can expand the content item, show comments associated with the content item, allow the user to comment on the content item, rate the content item, or provide the user with additional content associated with the content item (e.g., open a webpage or application linked within the content item). As an additional example, in the instance that the content item is a music file, upon a user selecting the content item, the user interface provider 104 can play the music file, or play a sample of the music file. Other examples exist, as one will appreciate, depending on type of content item.

As mentioned above, and as FIG. 1 illustrates, the system 100 further can include a user interaction detector 106. In general, the user interaction detector 106 can detect, receive, and/or facilitate user interactions in any suitable manner. In some example embodiments, the user interaction detector 106 detects one or more user interactions with respect to the user interface, and in response to the user interaction, can provide input data corresponding to the user interaction to the content item manager 108.

As referred to herein, "input data" is data that corresponds with a single user interaction, or combination of user interactions, provided by a user by way of one or more input devices. For example, the user interaction detector 106 can detect one or more user interactions from a keyboard, mouse, touch screen, or any other input device. In the event that the input device is a touch screen, the user interaction detector 106 can detect one or more touch gestures that a user provides by way of the touch screen (e.g., swipe gestures, tap gestures, pinch gestures, or reverse pinch gestures). In some embodiments, a user may provide a touch gesture in relation to and/or directed at one or more content items or elements of a user interface presented on the touch screen, as described herein.

In addition to detecting a user interaction, the user interaction detector 106 can identify user interaction characteristics, such as a direction, distance, and/or speed of a touch gesture. In one or more embodiments, the user interaction detector 106 may use a coordinate system to identify characteristics corresponding to the user interaction. For example, the user interaction detector 106 can receive data corresponding to a touch gesture that begins at a starting coordinate and finishes at an ending coordinate. The user interaction detector 106 can measure the time duration of a touch gesture and compare the starting coordinate to the ending coordinate to determine the distance, direction, and/or speed of the touch gesture.

The user interaction detector 106 can provide input data to the system 100 based on one or more user interaction characteristics. For instance, the user interaction detector 106 can provide input data to the content item manager 108, and in response, the content item manager 108 can control one or more functions of the system 100. For example, system 100 can use input data, alone or in combination with other data, to manage, control, and/or facilitate the use and navigation of a user interface. In particular, in response to the user interaction detector 106 detecting one or more touch gestures, the system 100 can cause content items to scroll through a group of content items provided to the user by the user interface, thereby allowing a user to navigate within a group of content items, as will further be described below.

As FIG. 1 illustrates, and as mentioned above, the system 100 includes a content item manager 108. The content item manager 108 can facilitate control of content items within the user interface. In particular, the content item manager 108 can control which content items to provide to the user interface provider 104 for display on a display device. For example, the content item manager 108 can receive input data from the user interaction detector 106, and in response to the input data, the content item manager 108 can control one or more features within the user interface. In particular, the content item manager 108 can control which content item is provided to a user when the user provides one or more user interactions to navigate through a group of content items.

One way in which the content item manager 108 controls navigation through content items is to identify a content item to provide to the user when the user provides a user interaction indicating a desire to navigate quickly within a group of content items. In particular, in response to a user providing a user interaction, the content item manager 108 can identify a content item to provide to the user interface provider 104, which facilitates the display of the identified content item within a user interface. For example, and as will be explained in greater detail below, the content item manager 108 can identify a content item based on one or more of factors, such as user interaction characteristics associated with a user interaction, a relevance factor, a proximity factor, one or more thresholds, system provider data, or other information available to the content item manager 108. Each factor is described below in additional detail.

As described briefly above with respect to the user interaction detector 106, the content item manager 108 can use, among other factors, one or more user interaction characteristics as a factor to identify a content item in response to a user interaction. The user interaction detector 106 can provide input data to the content item manager 108 that includes user interaction characteristics, as described above. The content item manager 108 can use the input data to determine one or more user interaction characteristics such as direction, distance, and/or speed with respect to an initial position within a group of content items (e.g., with respect to a content item initially displayed within a user interface). The content item manager 108, therefore, can use the determined user interaction characteristics as one or more factors to identify a content item to provide to the user.

To illustrate, in one or more example embodiments, the content item manager 108 can determine a direction to navigate within a group of content items using the input data. The content item manager 108 may select a content item based in part on the determined direction associated with the user interaction. For example, the determined direction may correspond with the user's desire to navigate, up, down, left, right, etc., with respect to an initial position within the group of content items. In some embodiments, the direction can be based on the arrangement of the group of content items. For example, the content item manager 108 may limit the direction to navigate to only up and down for a group of content items having a vertical arrangement, such as in a social-network newsfeed (e.g., see FIG. 2).

In addition to a direction of a user interaction, the content item manager 108 can use one or more user interaction characteristics associated with the distance and/or the speed of a user interaction as additional factors to identify one or more content items. For example, the content item manager 108 can determine a number of content items to navigate through (e.g., skip past) using the determined distance and/or speed associated with the user interaction. Alternatively, the content item manager 108 can determine a position within a group of content items using the determined distance and/or speed associated with the user interaction, as discussed below.

In one or more embodiments, the content item manager 108 can apply an algorithm to one or more user interaction characteristics to calculate one or more factors used in identifying a content item to provide to a user. For instance, the content item manager 108 can add or multiply a first value associated with the determined distance with a second value associated with the determined speed to obtain a navigational value. Alternatively, the content item manager 108 can identify a navigation value by looking up the determined distance and/or speed in a lookup table. Regardless of the algorithm or method used to determine a navigation value, the content item manager 108 can use a navigational value as a factor to identify a content item to provide to the user.

Using one or more of the above discussed elements or techniques, the content item manager 108 can use the one or more user interaction characteristics as a factor in a variety of to identify a position within a group of content items. In particular, the content item manager 108 can identify a list position within a group of content items having a list arrangement using one or more user interaction characteristics. For instance, the content item manager 108 can use the user interaction characteristics to identify a position that is x pages away from the page currently being shown to the user on the user interface (where x is a non-negative integer).

Another way in which the content item manager 108 can determine a position within a group of content items is to identify a target content item. The target content item, for example, can represent the position within a group of content items to which other calculations and factors are applied to eventually identify a content item to display to the user. Using the principles described above, the content item manager 108 may identify a target content item based on one or more user interaction characteristics. For instance, the content item manager 108 may identify a target content item based on the magnitude of a direction and a distance of a user interaction.

In some embodiments, the content item manager 108 may identify a target content item based on the content item initially displayed within a user interface at the time a user provides a user interaction. For example, the content item manager 108 can use the distance and speed of the user interaction to identify a content item within the group of content items that is x content items away from the content item initially displayed within a user interface (where x is a non-negative integer). One will appreciate that various other techniques can be used to identify a position within a group of content items based on receiving a user interaction.

As discussed above, the content item manager can use a proximity range as another factor in identifying a content item to provide to a user in response to a user interaction. For example, after identifying a position (e.g., a target content item), the content item manager 108 can determine a proximity range based on the identified position. In one or more embodiments, the proximity range can include each content item within a distance of x content items of an identified target content item (where x is a non-negative integer). For instance, the proximity range can include the content items adjacent to the target content item, or alternatively, may include each content item within a range of ten content items of the target content item. One will appreciate that the proximity range can include any number of content items depending on a particular embodiment.

In some embodiments, the number of content items in the proximity range (e.g., a subset of content items within a group of content items) can be based on one or more user interaction characteristics. For example, the content item manager 108 can increase the scope of the proximity range based on a user interaction characteristic, such as distance and/or speed. For instance, the content item manager 108 can double or triple the scope of the proximity range when the determined distance and/or speed increases beyond a particular threshold, as described below. Alternatively, rather than determining the scope of the proximity range using on one or more user interaction characteristics, one will appreciate that the scope of the proximity range can be fixed (e.g., user preferences/system provider defined), or based on other factors.

In addition to using the proximity range as a factor, the content item manager 108 can also use a relevance factor associated with content items in the process of identifying a content item to provide to a user. The relevance factor can correspond to a predicted level of user interest in a content item, which can be represented with a relevance value.

The content item manager 108 can determine the relevance factor for each content item using various techniques and information. In one or more embodiments, the content item manager 108 can base the relevance factor on information the system 100 obtains in connection with the user. For example, the user may rate a content item or indicate a preference for a type, group, or category of content items, which can influence the relevance factor for each content item. As another example, the content item manager 108 can base the relevance factor on the amount of time the user spends viewing or interacting with each content item, or if the user has not yet viewed a content item. Alternatively, or in addition, the system 100 can track one or more user actions (e.g., previous content item user selections or attributes of previously selected content items) as a basis to determine a relevance factor for each content item.

In addition to information associated with the user, one or more embodiments can base a relevance factor on information associated with a content item. In particular, the relevance factor can be based on content item popularity, recency, source, attributes, social trends, "likes," comments, ratings, and/or other information associated with a content item. For example, content items associated with a large number of "likes" can be assigned a relevance factor that is higher than content items associated with a lower number of "likes." The content item manager 108 can use any combination of information to determine the relevance factor of a particular content item.

The content item manager 108 can obtain the relevance factor for each content item from one or more sources. For example, a system provider can send a relevance factor in connection with each content item provided to the system 100. When the system 100 receives content items along with their corresponding relevance factors, the system 100 can employ the storage manager 110 to store the relevance factor corresponding to each content item as content item data 112. After determining a subset of content items (e.g., based on a proximity range), the content item manager 108 can look up and apply the corresponding relevance factors for each of the subset of content items to identify a content item to provide to a user.

Alternatively, the content item manager 108 can determine a relevance factor for each content item. In particular, after identifying a subset of content items (e.g., based on a proximity range), the content item manager can calculate a relevance factor for each of the subset of content items. As an example, if the content items are social-network posts, the content item manager 108 can score each social-network post according to content within the social-network posts or attributes associated with each social-network post. One will appreciate that other methods and approaches can be employed to determine a relevance factor for content items.

In addition to identifying a content item based on a relevance factor, and as mentioned above, the content item manager 108 can also select a content item based a proximity factor. The proximity factor can be a value that favors content items located closer to an identified position within a group of content items. For example, the proximity factor associated with a content item can decrease as the proximity between each content item and a target content item increases. For instance, the proximity factor can decrease linearly, logarithmically, exponentially, or in another manner, as will be appreciated. In one or more embodiments, the content item manager 108 can set the proximity factor of each content item not within the proximity range to zero (0). In other words, the proximity range can be defined as content items having a proximity factor greater than zero (0).

As mentioned above, the content item manager 108 can also use one or more user interaction thresholds associated with user interaction characteristics as a factor in identifying a content item to provide to the user in response to a user interaction. For example, one or more user interaction thresholds can correspond to values (e.g., direction and/or magnitude) of the user interaction characteristics, such as minimum and maximum values associated with one or more user interaction characteristics. For instance, thresholds can include a minimum or browsing threshold, a middle or scrolling threshold, and/or a maximum threshold.

In one or more embodiments, the content item manager 108 can use predetermined user interaction thresholds. For example, a system provider or a user can define one or more predetermined user interaction thresholds. Alternatively, the content item manager 108 can use dynamic user interaction thresholds. For example, the content item manager 108 can set user interaction thresholds based on the number of content items within the group of content items. As another example, the content item manager 108 can lower one or more user interaction thresholds when the user provides a second user interaction while the content item manager 108 is currently processing a first user interaction. In addition, the content item manager 108 can also use different user interaction thresholds based on the type of computing device on which the system 100 operates. For example, the content item manager 108 can identify which threshold to use based on the display size of a computing device.

The content item manager 108 can determine if a user interaction characteristic meets or exceeds one or more user interaction thresholds. For example, the content item manager 108 can determine if a user interaction characteristic (e.g., distance and/or speed) meets or exceeds the minimum or browsing threshold, the middle or scrolling threshold, or the maximum threshold. For instance, when the user interaction characteristic does not meet or exceed any user interaction threshold, the content item manager 108 can cause no navigational response to occur (e.g., no scrolling). However, if a user interaction meets or exceeds the minimum or browsing threshold, the content item manager 108 can cause the content items to slowly scroll from one content item to the next content item in a user interface.

Furthermore, if the user interaction characteristic exceeds the middle or scrolling threshold, the content item manager 108 can quickly scroll a group of content items through a user interface. In other words, when the user interaction characteristic exceeds the middle or scrolling threshold, the content item manager 108 uses a first method to identify a content item to display to a user. The first method may indicate that the user desires to quickly navigate through a group of content items, as described above. Also as described above, the first method can use defined factors to identify a content item to provide to the user in response to the user interaction. For example, the content item manager 108 can identify a content item to provide to the user based on user interaction characteristics, the proximity factor, and the relevance factor.

In addition, when the user interaction characteristic exceeds the maximum threshold, the content item manager 108 can use a second method to identify a content item to display to a user. In one or more embodiments, the second method, compared to the first method, may indicate the user is less concerned about the content item to which the user navigates so long as the content item manager 108 navigates through at least a minimum number of content items. For example, the content item manager 108 can favor or disfavor one or more factors in the second method compared to the first method to identify a content item.

To illustrate, for example, when the user interaction characteristic exceeds the maximum threshold, the content item manager 108 can give less weight to the proximity factor, as the user is generally less concerned about which content item the content item manager 108 identifies. In other words, when the user interaction characteristic exceeds the maximum threshold, the content item manager 108 can reduce or even eliminate the proximity factor. In this manner, the content item manager 108 can identify a content item within the subset of identified content items by favoring other factors, such as a relevance factor.

Alternatively, or additionally, when the user interaction characteristic exceeds the maximum threshold, the content item manager 108 can expand the scope of the proximity range, as described above. Alternatively, when the user interaction characteristic exceeds the maximum threshold, the content item manager 108 can forgo identifying a target content item and can identify any content item to provide to the user so long as the content item manager 108 skips over at least a minimum number of content items.

As described above, the content item manager 108 can use system provider data as a factor in identifying a content item to provide to a user in response to a user interaction to quickly navigate within a group of content items. For example, as described previously, the system provider may desire to present advertisement content items to a user as the user navigates through a group of content items. Accordingly, the content item manager 108 can identify an advertisement content item to provide to the user. For example, the content item manager 108 can strategically and dynamically favor advertisement content items over other factors when identifying a content item to provide to a user in response to a user interaction.

In one or more embodiments, for example, the content item manager 108 may override identifying a content item based on relevance and instead select an advertisement content item to display to the user. Alternatively, the content item manager 108 can select an advertisement content item when the user interaction characteristic exceeds the maximum threshold. In addition, or in the alternative, the content item manager 108 can select an advertisement content item when the advertisement content item is within the proximity range. Thus, if the content item manager 108 expands the scope of the proximity range when the user interaction characteristic exceeds the maximum threshold, there is a greater chance that the content item manager 108 will select an advertisement content item.

In some embodiments, the content item manager 108 can employ a rolling weight to determine if the content item manager 108 should identify an advertisement content item. For example, the content item manager 108 can increase the relevance of, or the weight given to, each advertisement content item until an advertisement content item is identified. When an advertisement content item is identified, the content item manager 108 can decrease or reset the relevance or weight for each advertisement content item. In this manner, the content item manager 108 optimizes the advertisement capabilities of a system 100, yet at the same time does not diminish the user experience by overloading the user with an advertisement each time the user requests to navigate though a group of content items.

In one or more embodiments, the content item manager 108 can identify a content item to provide to the user in response to a user interaction based on user preference. For example, each time the user provides a user interaction indicating a desire to navigate within a group of content items, the content item manager 108 can select the next unread content item. Alternatively or additionally, the content item manager 108 can select user-defined content items. For example, in the context of a social-network, the user can designate a list of contact or friends as favorites. Therefore, each time the user requests to navigate within a group of content items, the content item manager 108 can select the next content item corresponding to a favorite contact.

As discussed above, the system 100 can include a storage module 110, as FIG. 1 illustrates. Storage module 110 may maintain content item data 112 representative of data used in connection with content items. For example, in the case of the system 100 determining a relevance factor for each content item, the storage manager 110 can store the relevance factor as content item data 112. The storage manager 110 may also store other data that the system 100 uses in connection with navigating through a group of content items.

Each of the components 102-110 of the system 100 may be in communication with one another using any suitable communication technologies. It will be recognized that although components 102-110 are shown to be separate in FIG. 1, any of components 102-110 may be combined into fewer components, such as into a single facility or module, or divided into more components as may serve a particular embodiment.

The components 102-110 can comprise software, hardware, or both. For example, the components 102-110 can comprise one or more instructions stored on a computer-readable storage medium and executable by processors of one or more computing devices. When executed by the one or more processors, the computer-executable instructions of the system 100 can cause one or more computing device(s) to perform the methods described herein. Alternatively, the components 102-110 can comprise hardware, such as a special purpose processing device to perform a certain function or group of functions. Additionally or alternatively, the components 102-110 can comprise a combination of computer-executable instructions and hardware.

FIG. 2A illustrates an example embodiment of a computing device 200 that can implement system 100. For example, FIG. 2A illustrates the computing device 200 can be a mobile device, such as a mobile phone (e.g., a smartphone). However, in additional or alternative examples, system 100 may be implemented by any other suitable computing device, such as, but not limited to, a tablet device, a handheld device, a laptop or desktop computer, a personal-digital assistant device, and/or any other suitable computing device configured to perform one or more of the processes and/or operations described herein. As illustrated in FIG. 2A, computing device 200 may include and/or be associated with a touch screen 202 by way of which a user interface may be presented and/or by way of which a user interaction may be received and/or detected. Additionally or alternatively, computing device 200 may include any other suitable input device (e.g., a keypad, one or more input buttons).

In addition to example characteristics of computing device 200, FIGS. 2A-2B illustrate example embodiments of a user interface that allows a user to navigate through a group of content items using the principles described herein. As illustrated in FIG. 2A, the touch screen 202 can present a user interface that includes a content widow 204. In general, the content widow 204 is the portion of the user interface that facilitates the display of one or more content items 206 within the group of content items.

As shown in FIG. 2A, the content window 204 can display multiple content items 206. For example, the user interface provider 104 can arrange content items 206 in a vertical list arrangement. In one or more embodiments, the content window 204 can include multiple content items 206, with each content item 206 visually distinguished from other content items 206, as illustrated in FIG. 2A-2B. Alternatively, the content window 204 can include a single content item 206. For example, the content window 204 can display a single content item 206 spanning the entire content window 204. Alternatively, content in the content item 206 can expand beyond the content window 204 such that a user must provide a user interaction to view the remaining content in the content item 206.

In one or more embodiments, the user interface provider 104 can truncate the content within a content item 206 so that the content window 204 is able to display multiple content items 206. For example, the user interface provider 104 can format each content item 206 to have defined graphical dimensions, truncating any content that does not fit within the defined graphical dimensions. A user can access the truncated content in the content item 206 through a user interaction. For example, a user can select an option to view the truncated content (e.g., by way of a tap gesture with respect to a content item 206).

Although FIGS. 2A-2B indicate a single column of content items 206 within the content window 204, in alternative embodiments, the user interface provider 104 can provide multiple columns of content items 206 within the content window 204. For example, the user interface provider 104 can provide two columns of content items 206 in a content list arrangement (e.g., a two column listing of digital photos). In one or more embodiments, a user can define the arrangement of the content items 206 within content window 204 with one or more user setting preferences.

When navigating through content items 206, the system can identify and position a content item 206 such that the identified content item is not cutoff In other words, after the system 100 identifies a content item to display to the user, the system 100 positions the content item in the content window 204 such that the identified content item is not cutoff. More specifically, the system 100 can position the top of the content item at the top of the content window 204 (as illustrated in FIG. 2A with the content item labeled "Mom").

Content items 206 can relate to a variety of topics. For example, content items 206 can correspond to other users, people, interests, sports, entertainment, hobbies, groups, locations, etc. In addition, content items 206 can correspond to advertisements and recommendations. For instance, a content item 206 can correspond to an advertisement for one or more products or services associated with the system provider or a third party. As another example, the system 100 may provide recommended content items 206 to a user, such as recommending the user connect with another user.

Each content item 206 can include a variety of content. For example, content items 206 generally include text, images, links, etc. In particular, and as shown in FIG. 2A, content items 206 can include a label 208 identifying the source of the content item 206. For example, the label may refer to a person, company, group, or other entity. The content item 206 can also include an image 210 associated with the source of the content item, as illustrated in FIG. 2A. For example, the image 210 may be a picture of the person, or logo of the company, associated with the content item 206. In addition, the content item 206 can include information corresponding to the content item 206, such as an indication of when the content item 206 was created, updated, or received at the computing device 200.

Depending on a particular content item type, a content item 206 can include content that allows for user interaction, for example, by using the touch screen 202. For example, the content item 206 can include selectable options 212 that allow a user to interact with a content item 206. For example, FIG. 2A illustrates that the selectable options 212 can allow a user to comment on the content item 206, share the content item 206, or rate (e.g., indicate a "like") the content item 206, etc. Additionally, the content item 206 can allow a user to access additional content. For example, a content item 206 can provide a link to a website, application, another group or content items, a contact list, etc.

In addition to displaying the content items 206, the touch screen 202 can also allow a user to provide one or more user interactions to navigate through content items 206. For example, a user can provide a touch gesture indicating a desire to navigate within a group of content items. In particular, and as illustrated in FIG. 2B, a user can use a finger 212 to provide a user interaction indicating a desire to scroll up or down (as indicated by the arrows shown in FIG. 2B). In particular, the user can provide a touch gesture by swiping a finger 212 from one point on the touch screen 202 to a second point on a touch screen 202. Although FIG. 2A-2B illustrates a vertical arrangement with vertical scrolling, in one or more alternative embodiments, the system 100 can provide a horizontal arrangement with vertical scrolling, e.g., in the event the user rotates the computing device 200 ninety degrees.

In some embodiments, the system 100 can detect a variety of user interactions that correspond to a variety of functions. For example, the user can use a touch gesture that involves multiple fingers. As another example, the user can use a touch gesture that includes swiping and holding a user's finger on the touch screen 202. In some instances, the user can draw a symbol on the touch screen (e.g., a letter, number, etc.) to provide a user interaction. Further, the user can use a user interaction that does not require interaction with the touch screen 202. For example, the user can use eye movement (e.g., eye tracking) or physically changing the position of the computing device (e.g., tilting a mobile phone) to provide a user interaction.

In response to the various types of user interactions, the system 100 can use different methods to identify content items. For example, when a user provides a vertical swipe touch gesture with one finger that meets a threshold, the system 100 may identify a content item to provide to the user based primarily on relevance factors. Then, when a user provides a touch gesture with two fingers, the system 100 may identify a content item based on a different factor, such as if a content item is marked as unread. In other words, the user can provide a one-finger swipe when desiring to navigate between relevant content items, and the user can provide a two-finger swipe when desiring to navigate between unread content items.

One will appreciate that additional touch gestures can generate different responses from the system. In one or more embodiments, the user may provide a second user interaction before the system 100 has fully responded to the first user interaction. For example, if the user provides a tap gesture while the system 100 is currently navigating between content items in the group of content items (e.g., currently scrolling), the system 100 may cancel the content item identification process and current scrolling and provide the user with the content item the user selected via the tap gesture. The system 100 can also adjust the position of the content item the user selected using the tap gesture so that the beginning of the content item is not cutoff from the user's view. In other words, even when a user provides a touch gesture cancelling a previous navigational request, the system 100 can provide the user with a content item that does not require further user input by the user to view the content item provided to the user.

Alternatively, if the user provides a user interaction while the system 100 is currently navigating (e.g., scrolling) between content items in the group of content items, the system 100 can automatically jump to the content item identified based on a previous user interaction, rather than continuing to navigate to the identified content item. For example, using the principles described herein, the system 100 may identify a content item to provide to the user in response to a first user interaction (e.g., a vertical swipe gesture), and scroll towards the identified content item. The user can then provide a second user interaction (e.g., a tap gesture), and in response the system 100 can jump to the identified content item within the group of content items 206 to quickly provide the identified content item to the user.

As another example, the user may provide two user interactions (e.g., two vertical swipe gestures) in close succession. In response to the first user interaction, the system 100 can identify a content item to provide to the user as described above. In response to the second user interaction, the system 100 can update the identified content item, or in other words, the system 100 can identify a subsequent content item based on the characteristics of the second user interaction using one or more of the principles described herein. Alternatively, the system 100 can jump to the first or last content item in a group of content items in response to multiple user interactions provided in quick succession.

In some embodiments, the system 100 may identify a content item to provide to the user in response to a future user interaction. For example, the system 100 can identify multiple content items to provide to the user in response to a future user interaction for each direction and threshold range. For instance, if the system 100 determines, based on user interaction characteristics (e.g., direction, distance and/or speed), that a user interaction characteristic exceeds the middle or scrolling threshold in a particular direction, the system 100 may provide a first pre-identified content item to the user in response to the user interaction. Similarly, if the system 100 determines that a user interaction characteristic exceeds the maximum user interaction threshold in a particular direction, the system 100 may provide a second pre-identified content item to the user in response to the user interaction. For example, the system 100 may pre-identify an advertisement content item to provide to the user if the user subsequently provides a user interaction characteristic that exceeds the maximum threshold.

FIGS. 3A-3B illustrate a conceptual diagram that can represent one or more embodiments of the system. In particular, FIGS. 3A-3B show a group of content items 302 that includes multiple content items (e.g., Content Item A through content item n) in a horizontal arrangement (e.g., a horizontal gallery). As further illustrated in FIG. 3B, the system 100 can display one or more content items within a content window 304. For example, in one or more embodiments, the content window 304 can correspond to the content window 204 discussed above in connection with FIGS. 2A-2B. For instance, the content window 304 can facilitate the display of one or more content items within the group of content items 302 to a user on a mobile device.

Generally, and as discussed above, a user can navigate though the group of content items 302 by, for example, providing a user interaction that causes the system 100 to move (e.g., scroll) the content items within the group of content items through the content window 304. For example, and as illustrated in FIG. 3A, system 100 can initially provide Content Item A and Content Item B within the content window 304. With Content Item A and Content Item B within the content widow 304, the user can provide a user interaction 306. For example, and as illustrated in FIG. 3A, the user can provide a user interaction 306 that causes the group of content items to scroll to the left. Using one or more of the methods described herein, the system 100 can identify a content item to provide to the user in response to the user interaction 306, and move (e.g., scroll) the group of content left until arriving at the identified content item. For instance, the system can identify and provide Content Item E in the content window 304, as shown in FIG. 3B.

To illustrate additional details of the system 100, reference will be further made to FIGS. 3A-3B. In particular, with the user interface provider 104 providing Content Item A and Content Item B within content window 304, as shown in FIG. 3A, a user may provide a user interaction 306. The user interaction detector 106 can detect the user interaction 306 and provide user input data to the content item manager 108. After receiving the user input data, the content item manager 108 can determine one or more user interaction characteristics based on the user input data.

The content item manager 108 can use the one or more user interaction characteristics to identify a target content item 308. For example, as illustrated in FIG. 3A, the content item manager 108 can identify Content Item G as the target content item 308 based on the one or more user interaction characteristics. After identifying Content Item G as the target content item 308, content item manager 108 can further identify a subset of content items within a proximity range 310. For example, and as illustrated in FIG. 3A, the content manager 108 can identify Content Item D through Content Item J. Alternatively, the target content item 308 may not be in the middle of the proximity range 310. For example, the proximity range 310 can include the target content item 308 (e.g., Content Item G) and Content Items C-F. As another example, the proximity range 310 can span from the content item in the content window 304 (e.g., Content Item A) to the target content item 308 (e.g., Content Item G).

After identifying the subset of content items, content item manager 108 can use one or more factors associated with each content item within the subgroup of content items to identify a content item to provide within the content window 304. For example, the content item manager 108 can identify or determine a relevance factor for each content item within the subset of content items. In particular, the content item manager 108 can identify a relevance factor for each of Content Items D-J. As discussed in detail above, the relevance factor for each content item can be based on one or more content item characteristics, including but not limited to, recency, popularity, source, topic, contents, comments, views, or any other characteristic associated with each content item, depending on the type of content item. To illustrate, content item manager 108 can determine that Content Item D through Content Item J have relevance factors based on a predicted interest of the user in each of the content items as indicated in FIG. 4.

In addition to the relevance factor, and as explained in detail above, the content item manager 108 can also identify a proximity factor associated with each of the content items within the subgroup of content items. As explained above, the proximity factor can correspond to the proximity of each content item within the proximity range 310 to the target content item 308. To illustrate, content item manager 108 can determine that Content Item D through Content Item J have the proximity factors shown in FIG. 4 based on the proximity of each content items to the target content item 308, or in this example, Content Item G. As illustrated in FIG. 4, the proximity factors can relate linearly to the proximity of each content item relative to the target content item 308. In alternative embodiments, the proximity factors can relate exponentially relative to the target content item 308.

After determining the proximity factors, the content item manager 108 can then use the identified or determined factors to identify a content item to provide within the content window 304. In particular, content item manager 108 can use one or more algorithms in combination with the factors to identify a content item. To illustrate, the content item manager 108 may simply sum the relevance factor value and the proximity factor value for each of the content items within the subgroup to determine a score. The content item manager 108 can then identify the content item within the subgroup of content items that has the highest score. To illustrate, using the relevance factor and proximity factors shown above, Content Item E has the highest score compared to Content Item D through Content Item J.

Subsequent to identifying the content item with the highest score, the content item manager 108 can direct the user interface provider 104 to provide the content item having the highest score within the content window 304. To illustrate, the content item manager 108 directs the user interface provider 104 to provide Content Item E within the content window 304. Upon receiving the direction from the content item manger 108 to provide Content Item E within the content window 304, the user interface provider 104 can make one or more adjustments while navigating (e.g., scrolling) through the content items to cause the navigating to stop to display Content Item E within the user window 304. In one or more embodiments, the adjustments are imperceptible to the user.

For example, to provide Content Item E within the content window 304, the user interface can make one or more adjustments to a scrolling control. In one or more embodiments, for example, the user interface provider 104 can adjust a decay rate of the scrolling control to present Content Item E to the user. For example, the user interface provider 104 can increase the decay rate of the scrolling control to stop the scrolling sooner than otherwise, e.g., with Content Item E displayed within the content window 304. To illustrate another example, had content item manger 108 identified Content Item J instead, the user interface provider 104 would decrease the decay rate of the scrolling control to cause the scrolling to stop later than otherwise, e.g., with Content Item J displayed within the content window 304.

Alternatively, or in addition to adjusting a scrolling control, the user interface provider 104 can cause content items to appear to scroll through the content window 304 for an amount of time before providing the identified content item to the user in response to the user interaction. For example, the system 100 can appear to scroll for 0.5 seconds before appearing to land (e.g., stop scrolling) on the identified content item. The amount of time can vary depending, for example, on the magnitude of one or more user interaction characteristics (e.g., distance and/or speed), or if a user characteristic threshold is exceeded.

In addition to the above example of identifying Content Item E, system 100 can use various other methods, processes, and/or algorithms to identify a content item to provide within the content window 304. In one or more embodiments, for example, the particular method, process, and/or algorithm the system 100 uses can be based on a predefined method, a user interaction characteristic, a user interaction threshold, a user interaction type, and/or other factors. For example, the particular algorithm the system 100 uses to identify a content item can dynamically vary to favor or disfavor one or more factors. In particular, additional methods, processes, and algorithms of identifying a content item in response to a user request are provided below.

As described above, the system 100 can vary the scope of the proximity range 310 based on factors, such as the user interaction characteristics. For example, the content item manager 108 can modify the scope (e.g., increase or decrease the number of content items) of the proximity range 310 in proportion to the magnitude of a user interaction characteristic. For instance, the content item manager 108 can increase the scope of the proximity range 310 from Content Item F through Content Item H to Content Item D through Content Item J when the magnitude of the user interaction characteristic for speed increases. For example, the content item manager 108 can use a lookup table to identify a proximity range 310 associated with the magnitude of the speed. In some embodiments, the scope of the proximity range 310 can correspond to the user interaction thresholds. For instance, when a user interaction exceeds a maximum user interaction threshold, the content item manager 108 can increase the scope of the proximity range 310 from a number of content items including 10% of the group of content items to a number of content items including 25% of the group of content items.

Additionally or alternatively, the system 100 can increase the proximity range scope based on a particular type of user interaction. For example, the system 100 can identify any content item to provide to the user so long as the system 100 first navigates beyond a minimal number of content items in response to the user interaction 306. To illustrate, the system 100 can receive a user interaction that exceeds the maximum user interaction threshold while the user is viewing Content Item A. In response, the system 100 may determine that the scope of the proximity range 310 to include all content items beyond Content Item C. As such, the system 100 can identify a content item to provide to the user in response to the user interaction from Content Items D-J based on one or more other factors associated with Content Items D-J.

In some embodiments, the system 100 can apply different weights to the relevance factor and the proximity factor within the algorithm. For example, the system 100 can increase or decrease the weight of the proximity factor compared the relevance factor. To illustrate, the system 100 can assign a weight multiplier of two (2) to the proximity factor, while the system 100 can assign a weight multiplier of one (1) to the relevance factor. In such an instance, Content Item G has the highest score within Content Items D-J after summing the weighted relevance factor values and the weighted proximity factor values. One will appreciate that weighting can be applied to the proximity factor and/or the relevance factor in a variety of manners. For example, the system 100 can increase the relevance factor value of each content item by a defined value.

In some embodiments, the system 100 can favor or disfavor the proximity factor. As described above, when a user provides a user interaction 306 that exceeds a maximum user interaction threshold, the user may have little concern to which content item the user navigates. Alternatively, the user can provide a particular type of user interaction that indicates to the system 100 a lack of concern as to which content items the system 100 identifies. In response, the system 100 can give minimal, or no weight to the proximity factor when identifying a content item in response to the user interaction 306.

To illustrate, when the proximity factor is disregarded, Content Item E and Content Item J each have the highest score when comparing the scores of Content Item D through Content Item J. In this manner, the system 100 can identify either Content Item E or Content Item J as having the highest score and can provide either content item in response to the user interaction. Alternatively, when two or more content items are identified has having the same highest score, the system 100 can provide the content item nearest to the content item initially displayed within content window 304 prior to receiving the user interaction 306, or in this instance, Content Item E.

In one or more embodiments, the system 100 can favor or disfavor the relevance factor based on a type of user interaction. To illustrate, for example, the group of content items 302 consists of a photo library. In one or more embodiments, the user can provide a particular type of user interaction to navigate only between photos tagged as including the user. The system 100 can increase the relevance of the photos tagged as including the user based on the type of user interaction (e.g., a two finger vertical swipe). For example, Content Item I may be a tagged photo of the user, and as such, the system 100 can increase the relevance factor of Content Item I to have a more favorable relevance factor than the other photos based on the type of user interaction. Thus, the system 100 provides Content Item I to the user in response to the particular type of user interaction the user provides.

In one or more additional embodiments, the system 100 can activate an additional factor to identify a content item in response to a user interaction 306 meeting or exceeding a user interaction threshold, or in response to a particular type of user interaction. For example, when a user provides a particular type of user interaction, the system 100 may scroll to (e.g., identify and provide) the next unread content item. In this manner, the user can scroll between unread content items while skipping over previously viewed content items within the group of content items 302. To illustrate, a user can provide a tap gesture twice in succession. In response, the system 100 can navigate from Content Item A to Content Item H because Content Item H is the next unread content item.

In another instance, the system 100 can scroll to a similar content item as the one currently provided to the user, when the user interaction 306 exceeds the maximum threshold or based on a type of user interaction. For example, the system 100 can scroll to a content item provided by the same content source as the content item currently displayed to the user. To illustrate, a content source, such as a user group or a business can provide Content Item A and Content Item F to the user. If the user is viewing Content Item A and desires to navigate to the next content item from the same content source as Content Item A, the user can provide a particular type of user interaction, for example. In response, the system 100 can navigate from Content Item A to Content Item F.

In some embodiments, the system 100 can identify a content item based on system provider data. For example, the system 100 can navigate to an advertisement or recommended content item in response to a particular type of user interaction, or when the user interaction 306 exceeds a maximum user interaction threshold. For instance, the system 100 can increase the relevance factor of each advertisement content item to ensure selection of an advertisement content item. For example, Content Item G can be an advertisement content item. As shown in FIG. 4, Content Item G can have a lower relevance factor (e.g., a relevance factor of two (2)). The low relevance factor value can result in the system 100 not identifying and providing Content Item G to a user in response to a user interaction. However, when the system 100 detects a user interaction that exceeds the maximum user interaction threshold, for example, the system 100 can maximize the relevance factor of Content Item G. Thus, in response to the user interaction, the system 100 can then identify and provide Content Item G to the user.

Further, in some embodiments, the system 100 can use a rolling weight when identifying an advertisement content item to provide to the user when the user interaction 306 exceeds the maximum threshold. For instance, as described above, the system 100 can increase the weight given to each advertisement content item after each detected user interaction until an advertisement content item is identified. For example, the system 100 can increase the relevance factor by one (1) each time the system 100 detects a user interaction that exceeds the maximum user interaction threshold. After the system 100 identifies an advertisement content item, the system 100 can reset the relevance factor for each advertisement content item to a default value. Thus, the system 100 can satisfy the business objective of the system provider by providing advertisement content items to users while, at the same time, providing a quality user experience by not overloading the user with an advertisement content item each time provides a user interaction 306.

To illustrate, as shown in FIG. 4, Content Item G can have a relevance factor of two (2). After detecting a user interaction that exceeds the maximum user interaction threshold, the system 100 can increment the relevance factor for Content Item G by one (1). For example, the system 100 can increment the relevance factor for Content Item G to three (3). The system 100 may again detect a user interaction that exceeds the maximum user interaction threshold. Again, the system 100 can increment the relevance factor for Content Item G by one (1). This process can repeat until the system 100 provides Content Item G, or in some instances, another advertisement content item to the user. After the system 100 provides Content Item G or another advertisement content item to the user, the system 100 can reduce or reset the relevance factor for each advertisement content item.

Additionally, the user can define multiple settings or preferences to allow a user to navigate through the group of content items 302. For instance, the user can specify which factors correspond to which types of user interactions the user provides. For example, user can define a user interaction type that causes the system 100 to navigate to content items associated with a favorites list specified by the user. Similarly, the user can indicate, for example in a user preference, to which content item the system 100 should navigate when the user interaction 306 exceeds a user interaction threshold.

Figure 5:
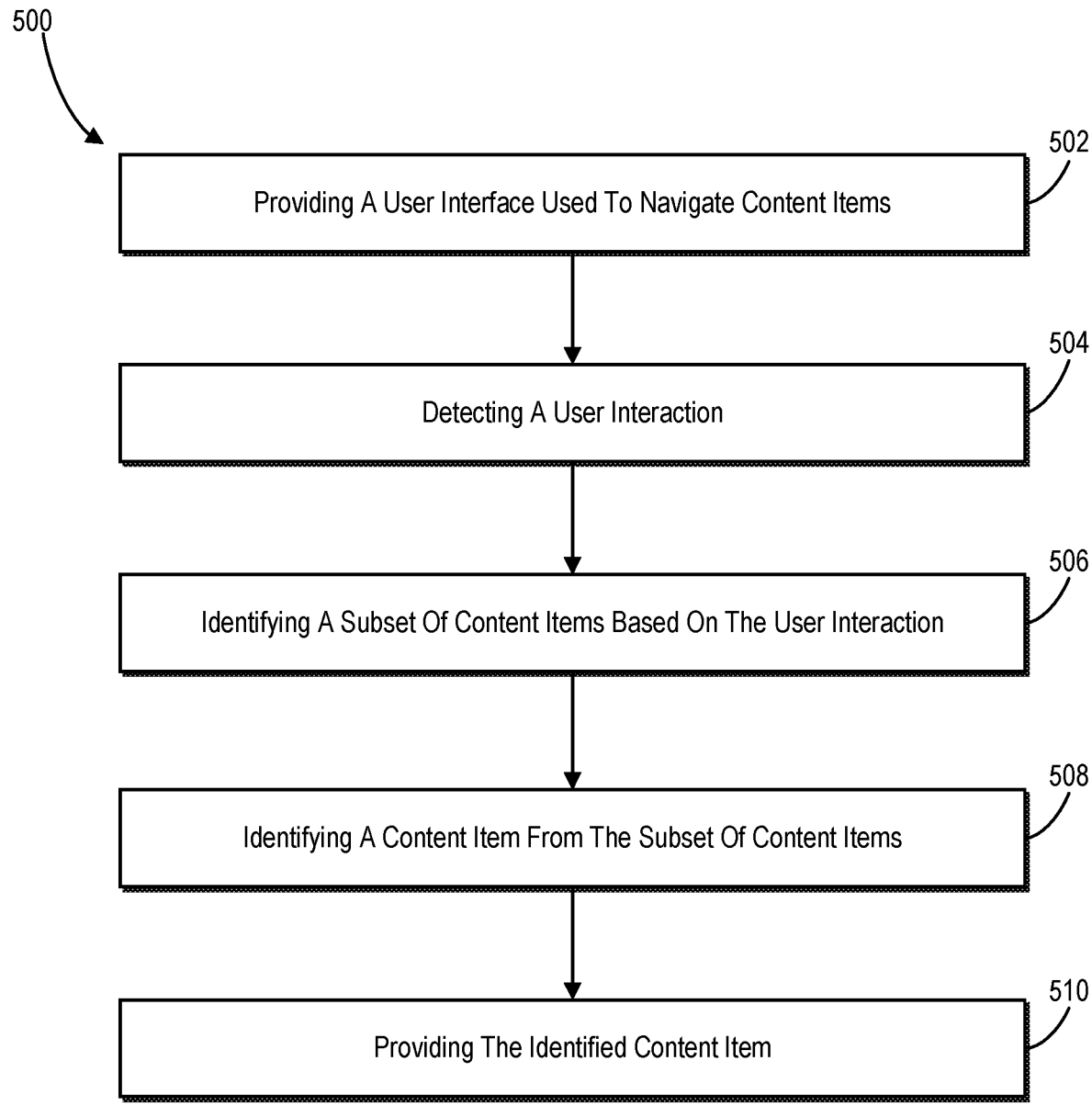
FIG. 5 illustrates a method of navigating through content items in accordance with one or more embodiments described herein.
Figure 6:
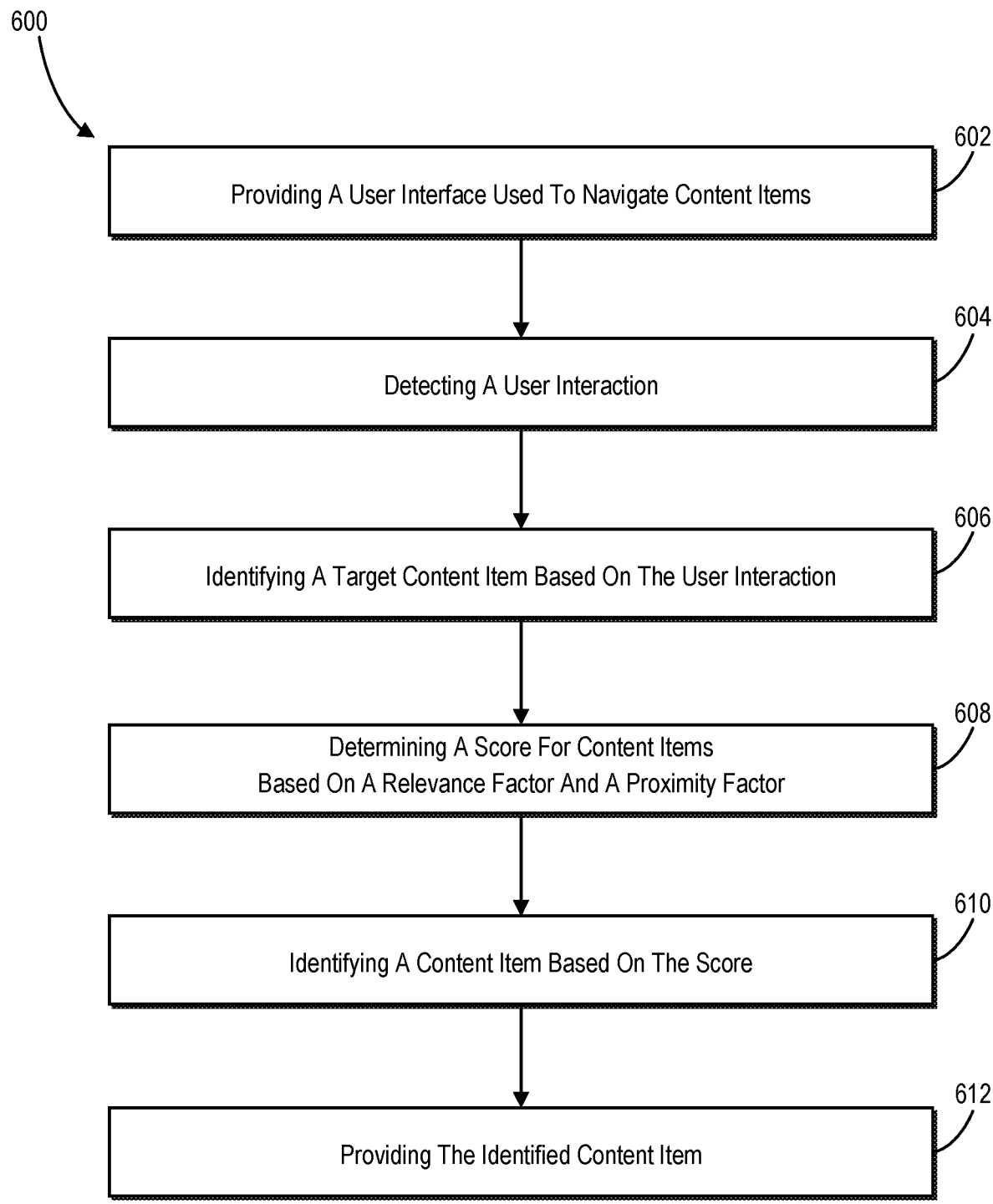
FIG. 6 illustrates another method of navigating through content items in accordance with one or more embodiments described herein.

FIGS. 1-4, the corresponding text, and the examples, provide a number of different systems and devices for identifying a content item to provide to a user in response to a user interaction. In addition to the foregoing, embodiments of the present invention also can be described in terms of flowcharts comprising acts and steps in a method for accomplishing a particular result. For example, FIGS. 5 and 6 illustrate flowcharts of exemplary methods in accordance with one or more embodiments of the present invention. The methods described in relation to FIGS. 5 and 6 can be performed with less or more steps/acts or the steps/acts can be performed in differing orders. Additionally, the steps/acts described herein can be repeated or performed in parallel with one another or in parallel with different instances of the same or similar steps/acts.

FIG. 5 illustrates a flowchart of one example method 500 of identifying a content item 206 to provide to a user in response to a user interaction 306. The method 500 includes an act 502 of providing a user interface used to navigate content items. In particular, act 502 can involve providing a graphical user interface used to navigate a plurality of content items 302. For example, act 502 can include the user interface provider 104 providing the user interface in any suitable manner disclosed herein.

In addition, method 500 further includes an act 504 of detecting a user interaction 306. In particular, act 504 can include detecting a user interaction with respect to the graphical user interface, the user interaction having a characteristic. For example, act 504 can include the user interaction detector 106 detecting a user interaction 306 with a computing device 200 in any suitable manner disclosed herein. In particular, act 504 can include detecting a user interaction 306 using a touch screen 202 (e.g., a touch gesture). The characteristic of the user interaction can be a characteristic of the touch gesture, e.g., a direction, or a magnitude of the distance or speed, of the touch gesture as explained in detail above.

Method 500 can additionally include an act 506 of identifying a subset of content items based on the user interaction 306. In particular, act 506 can include identifying, using at least one processor, a subset of content items of the plurality of content items 302 based on the characteristic of the user interaction 306. In one or more embodiments, act 506 can include identifying one or more content items 206 based on one or more user interaction characteristics, such a direction, distance, and speed. For example, act 506 can include the content item manager 108 determining user interaction characteristics based on input data provided by the user interaction detector 106. Furthermore, content item manager 108 can identify the subset of content items based on a location within a group of content items that corresponds with one or more of the determined user interaction characteristics.

Furthermore, the method 500 can also include an act 508 of identifying a content item from the subset of content items. In particular, act 508 can include identifying a content item from the subset of content items based on a relevance factor associated with each of the subset of content items. For example, the content item manager 108 can identify a content item from the subset of content items based on which content item within the subset of content items has the highest relevance factor. In addition, the content item manager 108 can use additional factors in identifying a content item, as disclosed in detail above.

Moreover, the method 500 can include an act 510 of providing the identified content item. In particular, act 510 can include providing, within the graphical user interface, the identified content item. For example, the content item manager 108 can provide the identified content item to a user interface provider 104 to provide the identified content item to the user in response to the user interaction 306. For instance, the user interface provider 104 can display the identified content item in content window 204.

Referring now to FIG. 6, a flowchart of another example method 600 of identifying a content item 206 to provide to a user in response to a user interaction 306. As shown, method 600 can include an act 602 of providing a user interface used to navigate content items. In particular, act 602 can involve providing a graphical user interface used to navigate a plurality of content items 302. For example, act 602 can include the user interface provider 104 providing the user interface in any suitable manner disclosed herein.

The method 600 can further include an act 604 of detecting a user interaction 306. In particular, act 604 can include detecting a user interaction having a characteristic. For example, act 604 can include the user interaction detector 106 detecting a user interaction 306 with a computing device 200 in any suitable manner disclosed herein. In particular, act 604 can include detecting a user interaction 306 using a touch screen 202 (e.g., a touch gesture). The characteristic of the user interaction can be a characteristic of the touch gesture, e.g., a direction, or a magnitude of the distance or speed, of the touch gesture as explained in detail above.

Additionally, the method 600 can include an act 606 of identifying, using at least one processor, a target content item 308 based on the user interaction 306. In particular, act 606 can include identifying a target content item 308 from the plurality of content items 302 based on the characteristic of the user interaction. In one example, act 606 can include a content item manager 108 identifying a target content item 308 based on one or more user interaction characteristics, such a direction, distance, and speed, as disclosed herein.

Furthermore, the method 600 can include an act 608 of determining a score for content items 206 based on a relevance factor and a proximity factor. In particular, the act 608 can include determining a score for one or more content items 206 within a proximity range 310 to the target content item 308 based on a relevance factor associated with each of the one or more content items 206 within the proximity range 310 and a proximity factor of each of the one or more content items within the proximity range 310. In one example embodiment, act 608 includes the content item manager 108 scoring content items 206 within a proximity range 310 to the target content item 308 based on a relevance factor and/or a proximity factor, as disclosed herein. To illustrate, the content item manager 108 can use an algorithm and weights to determine a score based on the relevance factor and proximity factor. In addition, the content item manager 108 can use additional factors in determining a score for each content item.

Method 600 can also include an act 610 of identifying a content item based on the score. In particular, act 610 can include identifying a content item 206 from the one or more content items based on the score for the one or more content items. For example, the content item manager 108 can identify a content item within the proximity range 310 having the highest score, as explained in detail above.

In addition, the method 600 can include an act 612 of providing the identified content item. In particular, act 612 can include providing the identified content item to the user within the graphical user interface. For example, the content item manager 108 can provide the identified content item to a user interface provider 104 to provide the identified content item within the content window 204. For instance, the user interface provider 104 can cause a scrolling control to stop such that the identified content item is presented in the content window 204.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the computing devices described herein). In general, a processor (e.g., a microprocessor) receives instructions, from a non-transitory computer-readable medium (e.g., a memory, etc.), and executes those instructions, thereby performing one or more processes, including one or more of the processes described herein.

The computer-readable media can be any available media that can be accessed by a general purpose or special purpose computer system or computing device. Computer-readable media that store computer-executable instructions may include non-transitory computer-readable storage media (devices). In addition, computer-readable media that carry computer-executable instructions may include transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code in the form of computer-executable instructions or data structures and which can be accessed by a general purpose or special purpose computer.

A "network" is defined as one or more data links that enable the transport of electronic data between computer systems and/or modules and/or other computing devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special-purpose computer, or special-purpose processing device to perform a certain function or group of functions. In some embodiments, computer-executable instructions are executed on a general-purpose computer to turn the general-purpose computer into a special-purpose computer implementing elements of the disclosure. The computer executable instructions may, for example, include binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that one or more embodiments included within the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Example embodiments included within the disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing environment can be composed of various characteristics such as, for example, on-demand self-service, broad network access, resource pooling, rapid elasticity, measured service, and so forth. A cloud-computing environment can also expose various service models, such as, for example, Software as a Service ("SaaS"), Platform as a Service ("PaaS"), and Infrastructure as a Service ("IaaS"). A cloud-computing environment can also be deployed using different deployment models such as private cloud, community cloud, public cloud, hybrid cloud, and so forth. In this description and in the claims, a "cloud-computing environment" is an environment in which cloud computing is employed.

Figure 7:
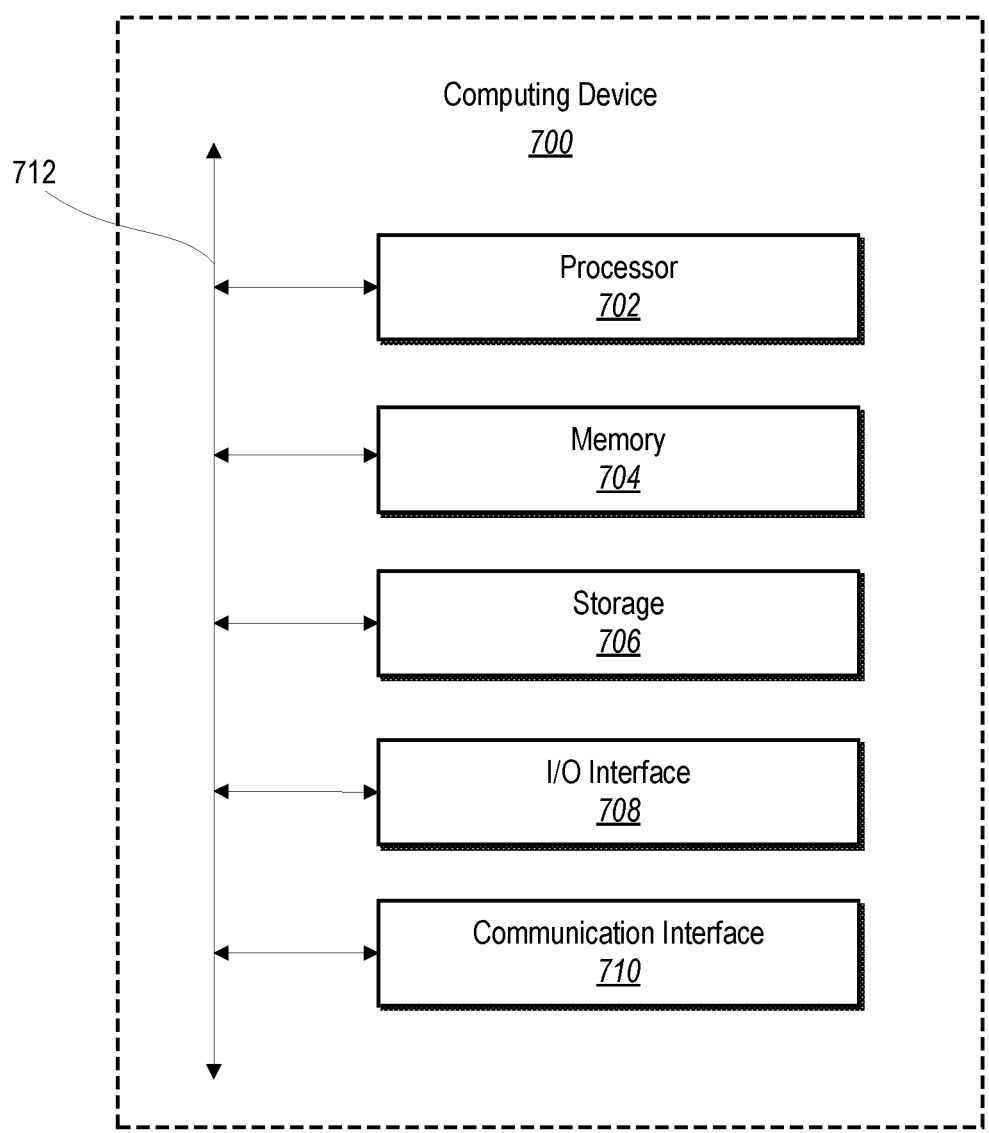
FIG. 7 illustrates a block diagram of a computing device in accordance with one or more embodiments described herein.

FIG. 7 illustrates a block diagram of exemplary computing device 700 that may be configured to perform one or more of the processes described above. One will appreciate that one or more computing devices, such as the computing device 700, may implement the content navigation system 100. As shown by FIG. 7, the computing device 700 can comprise a processor 702, a memory 704, a storage device 706, an I/O interface 708, and a communication interface 710, which may be communicatively coupled by way of a communication infrastructure 712. While an exemplary computing device 700 is shown in FIG. 7, the components illustrated in FIG. 7 are not intended to be limiting. Additional or alternative components may be used in other embodiments. Furthermore, in certain embodiments, the computing device 700 can include fewer components than those shown in FIG. 7. Components of the computing device 700 shown in FIG. 7 will now be described in additional detail.

In one or more embodiments, the processor 702 includes hardware for executing instructions, such as those making up a computer program. As an example and not by way of limitation, to execute instructions, the processor 702 may retrieve (or fetch) the instructions from an internal register, an internal cache, the memory 704, or the storage device 706 and decode and execute them. In one or more embodiments, the processor 702 may include one or more internal caches for data, instructions, or addresses. As an example and not by way of limitation, the processor 702 may include one or more instruction caches, one or more data caches, and one or more translation lookaside buffers (TLBs). Instructions in the instruction caches may be copies of instructions in the memory 704 or the storage 706.

The memory 704 may be used for storing data, metadata, and programs for execution by the processor(s). The memory 704 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 704 may be internal or distributed memory.

The storage device 706 includes storage for storing data or instructions. As an example and not by way of limitation, storage device 706 can comprise a non-transitory storage medium described above. The storage device 706 may include a hard disk drive (HDD), a floppy disk drive, flash memory, an optical disc, a magneto-optical disc, magnetic tape, or a Universal Serial Bus (USB) drive or a combination of two or more of these. The storage device 706 may include removable or non-removable (or fixed) media, where appropriate. The storage device 706 may be internal or external to the computing device 700. In one or more embodiments, the storage device 706 is non-volatile, solid-state memory. In other embodiments, the storage device 706 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 708 allows a user to provide input to, receive output from, and otherwise transfer data to and receive data from computing device 700. The I/O interface 708 may include a mouse, a keypad or a keyboard, a touch screen, a camera, an optical scanner, network interface, modem, other known I/O devices or a combination of such I/O interfaces. The I/O interface 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 708 is configured to provide graphical data to a display for presentation to a user. The graphical data may be representative of one or more graphical user interfaces and/or any other graphical content as may serve a particular implementation.

The communication interface 710 can include hardware, software, or both. In any event, the communication interface 710 can provide one or more interfaces for communication (such as, for example, packet-based communication) between the computing device 700 and one or more other computing devices or networks. As an example and not by way of limitation, the communication interface 710 may include a network interface controller (NIC) or network adapter for communicating with an Ethernet or other wire-based network or a wireless NIC (WNIC) or wireless adapter for communicating with a wireless network, such as a WI-FI.

Additionally or alternatively, the communication interface 710 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 710 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 710 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 712 may include hardware, software, or both that couples components of the computing device 700 to each other. As an example and not by way of limitation, the communication infrastructure 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

As mentioned above, the content navigation system 100 be implemented by, within, or be connected to a social-networking system. A social-networking system may enable its users (such as persons or organizations) to interact with the system and with each other. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, on-line calendars and event organization, messaging, games, or advertisements) to facilitate social interaction between or among users. Also, the social-networking system may allow users to post photographs and other multimedia content items to a user's profile page (typically known as "wall posts" or "timeline posts") or in a photo album, both of which may be accessible to other users of the social-networking system depending upon the user's configured privacy settings.

Figure 8:
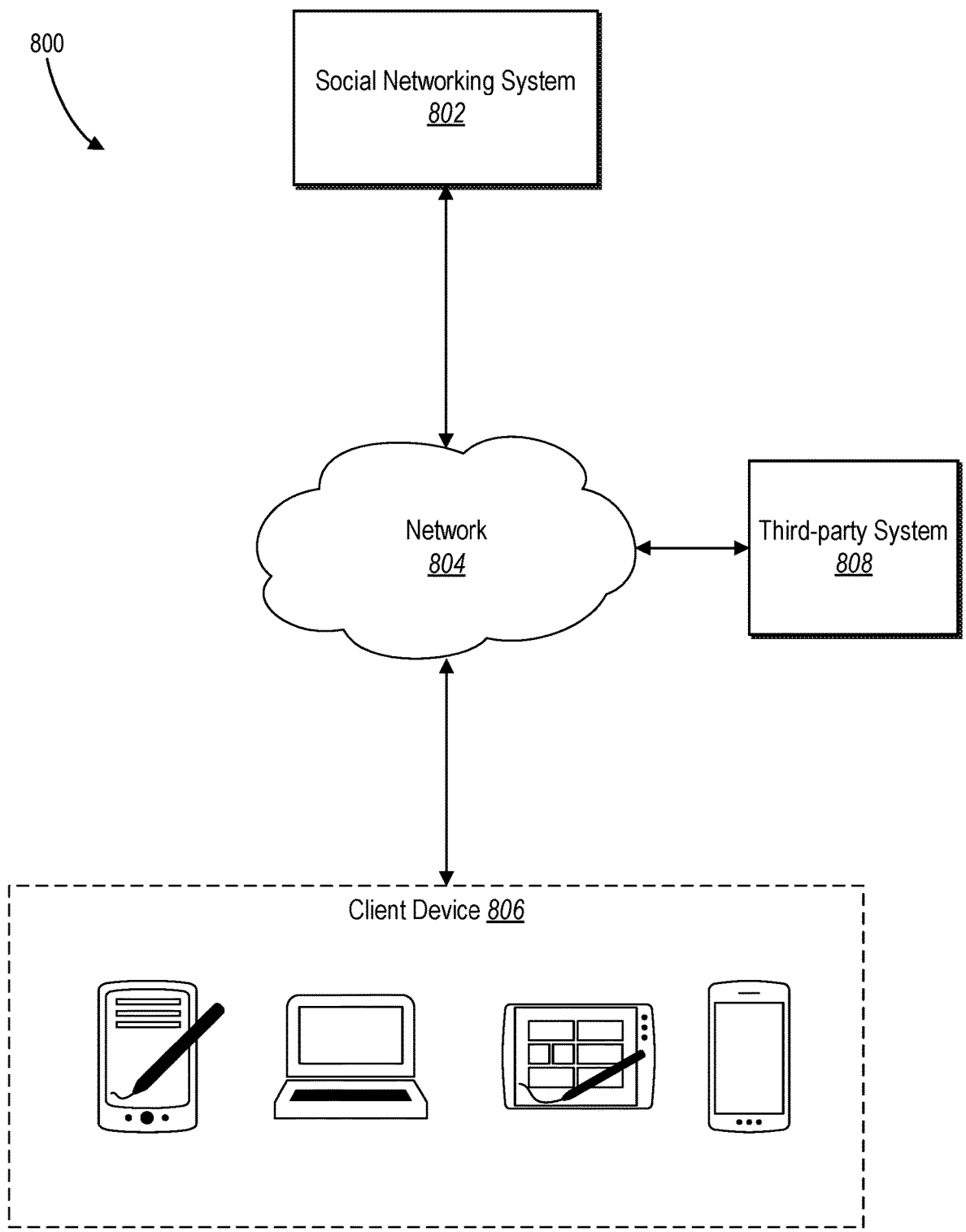
FIG. 8 illustrates a network environment of a social-networking system in accordance with one or more embodiments described herein.

FIG. 8 illustrates an example network environment 800 of a social-networking system. The network environment 800 includes a client device 806, a social-networking system 802, and a third-party system 808 connected to each other by a network 804. Although FIG. 8 illustrates a particular arrangement of client device 806, social-networking system 802, third-party system 808, and network 804, this disclosure contemplates any suitable arrangement of the client device 806, the social-networking system 802, the third-party system 808, and the network 804. As an example and not by way of limitation, two or more of the client device 806, the social-networking system 802, and the third-party system 808 may be connected to each other directly, bypassing the network 804. As another example, two or more of the client device 806, the social-networking system 802, and the third-party system 808 may be physically or logically co-located with each other in whole or in part. Moreover, although FIG. 8 illustrates a particular number of client devices 806, social-networking systems 802, third-party systems 808, and networks 804, this disclosure contemplates any suitable number of client devices 806, social-networking systems 802, third-party systems 808, and networks 804. As an example and not by way of limitation, network environment 800 may include multiple client devices 806, social-networking systems 802, third-party systems 808, and networks 804.

This disclosure contemplates any suitable network 804. As an example and not by way of limitation, one or more portions of network 804 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 804 may include one or more networks 804.

Links may connect client device 806, social-networking system 802, and third-party system 808 to communication network 804 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, client device 806 may be an electronic device including hardware, software, or embedded logic components or a combination of two or more such components and capable of carrying out the appropriate functionalities implemented or supported by client device 806. As an example and not by way of limitation, a client device 806 may include any of the computing devices discussed above in relation to FIG. 7. A client device 806 may enable a network user at client device 806 to access network 804. A client device 806 may enable its user to communicate with other users at other client systems 806.

In particular embodiments, client device 806 may include a web browser, such as MICROSOFT INTERNET EXPLORER, GOOGLE CHROME or MOZILLA FIREFOX, and may have one or more add-ons, plug-ins, or other extensions, such as toolbar. A user at client device 806 may enter a Uniform Resource Locator (URL) or other address directing the web browser to a particular server (such as server, or a server associated with a third-party system 808), and the web browser may generate a Hyper Text Transfer Protocol (HTTP) request and communicate the HTTP request to server. The server may accept the HTTP request and communicate to client device 806 one or more Hyper Text Markup Language (HTML) files responsive to the HTTP request. Client device 806 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 802 may be a network-addressable computing system that can host an online social network. Social-networking system 802 may generate, store, receive, and send social-networking data, such as, for example, user-profile data, concept-profile data, social-graph information, or other suitable data related to the online social network. Social-networking system 802 may be accessed by the other components of network environment 800 either directly or via network 804. In particular embodiments, social-networking system 802 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, social-networking system 802 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, a social-networking system 802, or a third-party system 808 to manage, retrieve, modify, add, or delete, the information stored in data store.

In particular embodiments, social-networking system 802 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Social-networking system 802 may provide users of the online social network the ability to communicate and interact with other users. In particular embodiments, users may join the online social network via social-networking system 802 and then add connections (e.g., relationships) to a number of other users of social-networking system 802 whom they want to be connected to. Herein, the term "friend" may refer to any other user of social-networking system 802 with whom a user has formed a connection, association, or relationship via social-networking system 802.

In particular embodiments, social-networking system 802 may provide users with the ability to take actions on various types of items or objects, supported by social-networking system 802. As an example and not by way of limitation, the items and objects may include groups or social networks to which users of social-networking system 802 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 802 or by an external system of third-party system 808, which is separate from social-networking system 802 and coupled to social-networking system 802 via a network 804.

In particular embodiments, social-networking system 802 may be capable of linking a variety of entities. As an example and not by way of limitation, social-networking system 802 may enable users to interact with each other as well as receive content from third-party systems 808 or other entities, or to allow users to interact with these entities through an application programming interfaces (API) or other communication channels.

In particular embodiments, a third-party system 808 may include one or more types of servers, one or more data stores, one or more interfaces, including but not limited to APIs, one or more web services, one or more content sources, one or more networks, or any other suitable components, e.g., that servers may communicate with. A third-party system 808 may be operated by a different entity from an entity operating social-networking system 802. In particular embodiments, however, social-networking system 802 and third-party systems 808 may operate in conjunction with each other to provide social-networking services to users of social-networking system 802 or third-party systems 808. In this sense, social-networking system 802 may provide a platform, or backbone, which other systems, such as third-party systems 808, may use to provide social-networking services and functionality to users across the Internet.

In particular embodiments, a third-party system 808 may include a third-party content object provider. A third-party content object provider may include one or more sources of content objects, which may be communicated to a client device 806. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 802 also includes user-generated content objects, which may enhance a user's interactions with social-networking system 802. User-generated content may include anything a user can add, upload, send, or "post" to social-networking system 802. As an example and not by way of limitation, a user communicates posts to social-networking system 802 from a client device 806. Posts may include data such as status updates or other textual data, location information, photos, videos, links, music or other similar data or media. Content may also be added to social-networking system 802 by a third-party through a "communication channel," such as a newsfeed or stream.

In particular embodiments, social-networking system 802 may include a variety of servers, sub-systems, programs, modules, logs, and data stores. In particular embodiments, social-networking system 802 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 802 may also include suitable components such as network interfaces, security mechanisms, load balancers, failover servers, management-and-network-operations consoles, other suitable components, or any suitable combination thereof. In particular embodiments, social-networking system 802 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 802 to one or more client systems 806 or one or more third-party system 808 via network 804. The web server may include a mail server or other messaging functionality for receiving and routing messages between social-networking system 802 and one or more client systems 806. An API-request server may allow a third-party system 808 to access information from social-networking system 802 by calling one or more APIs. An action logger may be used to receive communications from a web server about a user's actions on or off social-networking system 802. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of social-networking system 802. A privacy setting of a user determines how particular information associated with a user can be shared. The authorization server may allow users to opt in to or opt out of having their actions logged by social-networking system 802 or shared with other systems (e.g., third-party system 808), such as, for example, by setting appropriate privacy settings. Third-party-content-object stores may be used to store content objects received from third parties, such as a third-party system 808. Location stores may be used for storing location information received from client systems 806 associated with users. Advertisement-pricing modules may combine social information, the current time, location information, or other suitable information to provide relevant advertisements, in the form of notifications, to a user.

Figure 9:
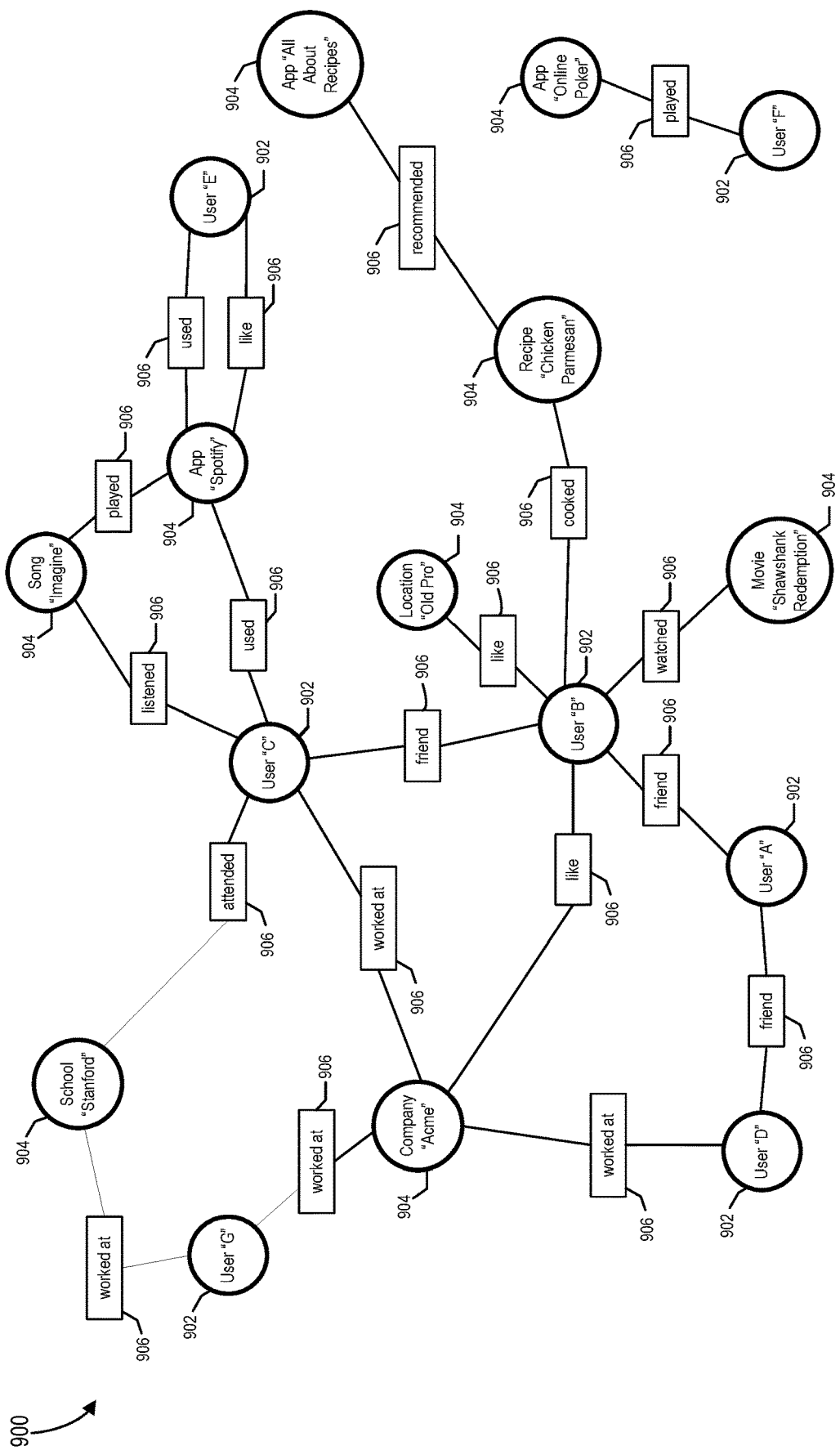
FIG. 9 illustrates a social graph in accordance with one or more embodiments described herein.

FIG. 9 illustrates example social graph 900. In particular embodiments, social-networking system 802 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 802, client device 806, or third-party system 808 may access social graph 900 and related social-graph information for suitable applications. The nodes and edges of social graph 900 may be stored as data objects, for example, in a data store (such as a social-graph database). Such a data store may include one or more searchable or query able indexes of nodes or edges of social graph 900.

In particular embodiments, a user node 902 may correspond to a user of social-networking system 802. As an example and not by way of limitation, a user may be an individual (human user), an entity (e.g., an enterprise, business, or third-party application), or a group (e.g., of individuals or entities) that interacts or communicates with or over social-networking system 802. In particular embodiments, when a user registers for an account with social-networking system 802, social-networking system 802 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 802. In particular embodiments, a user node 902 may be associated with information provided by a user or information gathered by various systems, including social-networking system 802. As an example and not by way of limitation, a user may provide his or her name, profile picture, contact information, birth date, sex, marital status, family status, employment, education background, preferences, interests, or other demographic information. Each user node of the social graph may have a corresponding web page (typically known as a profile page). In response to a request including a user name, the social-networking system can access a user node corresponding to the user name, and construct a profile page including the name, a profile picture, and other information associated with the user. A profile page of a first user may display to a second user all or a portion of the first user's information based on one or more privacy settings by the first user and the relationship between the first user and the second user.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 802 or a third-party website associated with a web-application server); an entity (such as, for example, a person, business, group, sports team, or celebrity); a resource (such as, for example, an audio file, video file, digital photo, text file, structured document, or application) which may be located within social-networking system 802 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 904 may be associated with information of a concept provided by a user or information gathered by various systems, including social-networking system 802. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 802. Profile pages may also be hosted on third-party websites associated with a third-party server 808. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 808. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 806 to send to social-networking system 802 a message indicating the user's action. In response to the message, social-networking system 802 may create an edge (e.g., an "eat" edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 802 may send a "friend request" to the second user. If the second user confirms the "friend request," social-networking system 802 may create an edge 906 connecting the first user's user node 902 to the second user's user node 902 in social graph 900 and store edge 906 as social-graph information in one or more of data stores. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to a edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 802 may create a "favorite" edge or a "check in" edge in response to a user's action corresponding to a respective action. As another example and not by way of limitation, a user (user "C") may listen to a particular song ("Ramble On") using a particular application (SPOTIFY, which is an online music application). In this case, social-networking system 802 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 802 may create a "played" edge 906 (as illustrated in FIG. 9) between concept nodes 904 corresponding to the song and the application to indicate that the particular song was played by the particular application. In this case, "played" edge 906 corresponds to an action performed by an external application (SPOTIFY) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "SPOTIFY").

In particular embodiments, social-networking system 802 may create an edge 906 between a user node 902 and a concept node 904 in social graph 900. As an example and not by way of limitation, a user viewing a concept-profile page (such as, for example, by using a web browser or a special-purpose application hosted by the user's client device 806) may indicate that he or she likes the concept represented by the concept node 904 by clicking or selecting a "Like" icon, which may cause the user's client device 806 to send to social-networking system 802 a message indicating the user's liking of the concept associated with the concept-profile page. In response to the message, social-networking system 802 may create an edge 906 between user node 902 associated with the user and concept node 904, as illustrated by "like" edge 906 between the user and concept node 904. In particular embodiments, social-networking system 802 may store an edge 906 in one or more data stores. In particular embodiments, an edge 906 may be automatically formed by social-networking system 802 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 802). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 802 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 802) or RSVP (e.g., through social-networking system 802) to an event associated with the advertisement. In addition or as an alternative, an advertisement may include social-networking-system context directed to the user. As an example and not by way of limitation, an advertisement may display information about a friend of the user within social-networking system 802 who has taken an action associated with the subject matter of the advertisement.

In particular embodiments, social-networking system 802 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 808 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 802 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 802 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 802 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 802 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 802 may calculate a coefficient based on a user's actions. Social-networking system 802 may monitor such actions on the online social network, on a third-party system 808, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, social-networking system 802 may calculate a coefficient based on the user's actions with particular types of content. The content may be associated with the online social network, a third-party system 808, or another suitable system. The content may include users, profile pages, posts, news stories, headlines, instant messages, chat room conversations, emails, advertisements, pictures, video, music, other suitable objects, or any combination thereof. Social-networking system 802 may analyze a user's actions to determine whether one or more of the actions indicate an affinity for subject matter, content, other users, and so forth. As an example and not by way of limitation, if a user may make frequently posts content related to "coffee" or variants thereof, social-networking system 802 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 802 may calculate a coefficient based on the type of relationship between particular objects. Referencing the social graph 900, social-networking system 802 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 802 may determine that the user has a higher coefficient with respect to the first photo than the second photo because having a tagged-in-type relationship with content may be assigned a higher weight and/or rating than having a like-type relationship with content. In particular embodiments, social-networking system 802 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 802 may determine that the first user should also have a relatively high coefficient for the particular object. In particular embodiments, the coefficient may be based on the degree of separation between particular objects. Degree of separation between any two nodes is defined as the minimum number of hops required to traverse the social graph from one node to the other. A degree of separation between two nodes can be considered a measure of relatedness between the users or the concepts represented by the two nodes in the social graph. For example, two users having user nodes that are directly connected by an edge (i.e., are first-degree nodes) may be described as "connected users" or "friends." Similarly, two users having user nodes that are connected only through another user node (i.e., are second-degree nodes) may be described as "friends of friends." The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 802 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 806 of the user). A first user may be more interested in other users or concepts that are closer to the first user. As an example and not by way of limitation, if a user is one mile from an airport and two miles from a gas station, social-networking system 802 may determine that the user has a higher coefficient for the airport than the gas station based on the proximity of the airport to the user.

In particular embodiments, social-networking system 802 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 802 may provide information that is relevant to user's interests and current circumstances, increasing the likelihood that they will find such information of interest. In particular embodiments, social-networking system 802 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 802 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 802 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 808 (e.g., via an API or other communication channel), or from another suitable system. In response to the request, social-networking system 802 may calculate the coefficient (or access the coefficient information if it has previously been calculated and stored). In particular embodiments, social-networking system 802 may measure an affinity with respect to a particular process. Different processes (both internal and external to the online social network) may request a coefficient for a particular object or set of objects. Social-networking system 802 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference in their entirety.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 904 corresponding to a particular photo may have a privacy setting specifying that the photo may only be accessed by users tagged in the photo and their friends. In particular embodiments, privacy settings may allow users to opt in or opt out of having their actions logged by social-networking system 802 or shared with other systems (e.g., third-party system 808). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 808, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, social-networking system 802 may send a request to the data store for the object. The request may identify the user associated with the request and may only be sent to the user (or a client device 806 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments. Additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A non-transitory computer-readable medium comprising instructions thereon that, when executed by at least one processor, cause a computing device to:
   detect a user interaction with respect to a graphical user interface comprising a listing of a plurality of content items;
   initiate, in response to the user interaction, an inertial scroll through the listing of the plurality of content items in accordance with one or more characteristics of the user interaction;
   identify a first content item from the plurality of content items, the first content item to be shown within the graphical user interface at an end of the inertial scroll;
   determine a weighted score for each content item in a subset of content items that is within a proximity range relative to the first content item, the subset of content items comprising at least the first content item and a second content item, wherein the weighted score comprises a combination of a weighted proximity factor and a weighted relevance factor, and wherein the weighted proximity factor for each content item in the subset of content items is weighted based on the one or more characteristics of the user interaction; and
   in response to determining that the second content item has a higher weighted score than the first content item, modify the inertial scroll to end with the second content item shown within the graphical user interface instead of the first content item.

2. The non-transitory computer-readable medium of claim 1, further comprising instructions that, when executed by the at least one processor, cause the computing device to identify the first content item based on a scroll magnitude value determined based on the one or more characteristics of the user interaction.

3. The non-transitory computer-readable medium of claim 1, further comprising instructions that, when executed by the at least one processor, cause the computing device to determine the weighted score for the second content item based on the weighted relevance factor that correlates content item characteristics of the second content item with preferences of a user.

4. The non-transitory computer-readable medium of claim 1, further comprising instructions that, when executed by the at least one processor, cause the computing device to determine a proximity factor for each content item in the subset of content items within the proximity range relative to the first content item, wherein a given proximity factor for a given content item corresponds to a proximity of the given content item to the first content item.

5. The non-transitory computer-readable medium of claim 4, further comprising instructions that, when executed by the at least one processor, cause the computing device to weight the proximity factor for the subset of content items based on the one or more characteristics of the user interaction by decreasing the weight to the proximity factor based on a magnitude of the user interaction.

6. The non-transitory computer-readable medium of claim 5, further comprising instructions that, when executed by the at least one processor, cause the computing device to decrease the weight to the proximity factor to zero when the magnitude of the user interaction meets or exceeds a maximum user inertia scroll threshold.

7. The non-transitory computer-readable medium of claim 4, wherein the proximity factor decreases linearly as a distance between the first content item and a given content item within the subset of content item increases.

8. The non-transitory computer-readable medium of claim 4, wherein the proximity factor decreases logarithmically as a distance between the first content item and given content item increases.

9. A system, comprising:
at least one processor;
at least one non-transitory computer readable storage medium storing instructions thereon that, when executed by the at least one processor, cause a computing device to:
detect a user interaction with respect to a graphical user interface comprising a listing of a plurality of content items;
initiate, in response to the user interaction, an inertial scroll through the listing of the plurality of content items in accordance with one or more characteristics of the user interaction;
identify a first content item from the plurality of content items, the first content item to be shown within the graphical user interface at an end of the inertial scroll;
determine a weighted score for each content item in a subset of content items that is within a proximity range relative to the first content item, the subset of content items comprising at least the first content item and a second content item, wherein the weighted score comprises a combination of a weighted proximity factor and a weighted relevance factor, and wherein the weighted proximity factor for each content item in the subset of content items is weighted based on the one or more characteristics of the user interaction; and
modify, in response to determining that the second content item has a higher weighted score than the first content item, the inertial scroll to end with the second content item shown within the graphical user interface instead of the first content item.

10. The system of claim 9, wherein:
the listing of the plurality of content items comprises a social networking newsfeed; and
the plurality of content items comprises one or more social networking posts.

11. The system of claim 9, further comprising instructions that cause the computing device to determine a proximity factor for each content item in the subset of content items within the proximity range relative to the first content item, wherein a given proximity factor for a given content item corresponds to a proximity of the given content item to the first content item.

12. The system of claim 11, further comprising instructions that cause the computing device to determine the weighted score for each content item in the subset of content items within the proximity range to the first content item by:
assigning a first weight to the relevance factor to obtain the weighted relevance factor; and
assigning a second weight to the proximity factor to obtain the weighted proximity factor.

13. The system of claim 12, further comprising instructions that cause the computing device to determine the weighted relevance factor for each content item in of the subset of content items within the proximity range to the first content item based on the one or more characteristics of the user interaction.

14. The system of claim 13, further comprising instructions that cause the computing device to determine whether the one or more characteristics of the user interaction meets or exceeds a maximum user inertia scroll threshold.

15. The system of claim 14, further comprising instructions that cause the computing device to reduce the second weight assigned to the proximity factor when the one or more characteristics of the user interaction meets or exceeds the maximum user inertia scroll threshold.

16. The system of claim 14, further comprising instructions that cause the computing device to increase the proximity range to include additional content items when the one or more characteristics of the user interaction meets or exceeds the maximum user inertia scroll threshold.

17. The system of claim 14, further comprising instructions that cause the computing device to decrease the second weight assigned to the proximity factor to zero when the one or more characteristics of the user interaction meets or exceeds the maximum user inertia scroll threshold.

18. The system of claim 17, further comprising instructions that cause the computing device to:
identify a user interaction type of the user interaction; and
activate, based on the identified user interaction type, an additional factor to be used in place of the proximity factor when determining weighted scores for each content item in the subset of content items.

19. A method comprising:
detecting a user interaction with respect to a graphical user interface comprising a listing of a plurality of content items;
initiating, in response to the user interaction, an inertial scroll through the listing of the plurality of content items in accordance with one or more characteristics of the user interaction;
identifying a first content item from the plurality of content items, the first content item to be shown within the graphical user interface at an end of the inertial scroll;
determining, by at least one processor, a weighted score for each content item in a subset of content items that is within a proximity range relative to the first content item, the subset of content items comprising at least the first content item and a second content item, wherein the weighted score comprises a combination of a weighted proximity factor and a weighted relevance factor, and wherein the weighted proximity factor for each content item in the subset of content items is weighted based on the one or more characteristics of the user interaction; and modifying, in response to determining that the second content item has a higher weighted score than the first content item, the inertial scroll to end with the second content item shown within the graphical user interface instead of the first content item.

20. The method of claim 19, further comprising decreasing the weight to the proximity factor to zero when a characteristic of one or more characteristics of the user interaction meets or exceeds a maximum user inertia scroll threshold.

\* \* \* \* \*